(12) United States Patent
Corn

(10) Patent No.: US 7,448,757 B2
(45) Date of Patent: Nov. 11, 2008

(54) PROJECTION TELEVISION APPARATUS

(75) Inventor: Roger Corn, Tokyo (JP)

(73) Assignee: Sony Corporation, Tokyo (JP)

( * ) Notice: Subject to any disclaimer, the term of this patent is extended or adjusted under 35 U.S.C. 154(b) by 323 days.

(21) Appl. No.: 11/451,518

(22) Filed: Jun. 13, 2006

(65) Prior Publication Data

US 2006/0290904 A1    Dec. 28, 2006

(30) Foreign Application Priority Data

Jun. 14, 2005  (JP)  ............................. 2005-174275

(51) Int. Cl.
*G03B 21/22*  (2006.01)
(52) U.S. Cl. ........................... 353/74; 353/101; 353/119
(58) Field of Classification Search ................... 353/74, 353/101, 119; 348/745
See application file for complete search history.

(56) References Cited

U.S. PATENT DOCUMENTS 6,412,955 B1 *  7/2002  Han ........................... 353/122
6,883,920 B2 *  4/2005  Chen .......................... 353/119

FOREIGN PATENT DOCUMENTS

JP     2000-10188      1/2000

* cited by examiner

*Primary Examiner*—Christopher Mahoney
(74) *Attorney, Agent, or Firm*—Finnegan, Henderson, Farabow, Garrett & Dunner, L.L.P.

(57) ABSTRACT

A projection television apparatus includes: frame; rear projection screen; and projector unit for emitting image projection light beam onto rear of screen; wherein projector unit includes; illuminating means, image forming means for modulating light beams on basis of image information, and projection lens for projecting image onto screen; optical axis of projection light beam is bent with optical axis of projection lens; part extending from image forming means to projection lens is separated from light source side unit, and part extending from image forming means to projection lens is formed as integrally coupled body into image emergence side unit; support mechanism for supporting image emergence side unit with frame rotatably around optical axis of projection lens along plane orthogonal to optical axis, image adjusting mechanism by rotation for adjusting angle of rotation around optical axis of projection lens, and securing mechanism for image emergence side unit with frame are provided.

10 Claims, 22 Drawing Sheets

PROJECTION TELEVISION APPARATUS

CROSS REFERENCES TO RELATED APPLICATIONS

The present invention contains subject matter related to Japanese Patent Application 2005-174275 filed in the Japanese Patent Office on Jun. 14, 2005, the entire contents of which being incorporated herein by reference.

BACKGROUND OF THE INVENTION

1. Field of the Invention

The present invention relates to a projection television apparatus.

2. Description of Related Art

A projection television apparatus is available, which includes a frame, a rear projection screen attached to a front surface of the frame, and a projector unit, disposed in the frame, for emitting an image projection light beam onto a rear surface of the rear projection screen via a projection lens.

The projector unit is provided with image forming means including, e.g., transmissive liquid crystal display units, whereby light beams emitted from a light source are modulated by the liquid crystal display units on the basis of image information to generate the image projection light beam.

FIG. 22 is a front view of such a projection television apparatus 1. In a front surface 4 of a frame 2 is a rectangular screen 6, which is disposed with its long sides aligned with the horizontal direction and its short sides with the vertical direction.

In such a projection television apparatus, due to the projector unit being out of position with respect to the frame, specifically, due to the liquid crystal display units being out of position in a direction of rotation around the corresponding optical axes of the light beams passing through the liquid crystal display units, four sides of an image G projected onto the screen 2 do not parallel four sides of the screen 6 as shown by a broken line, and thus the image G suffers deviations from the screen 2 in the direction of rotation.

In order to overcome this inconvenience, an adjusting technique has been proposed (see Patent Document 1), in which an adjusting mechanism having a fixed table secured to the frame 2 and a rotating table rotatably supported by this fixed table is provided. The projector unit is attached to the rotating table, and the rotating table is then rotated around an optical axis of the projection lens for adjustment.

According to such a conventional technique, by rotating the entire projector unit together with the rotating table, the deviations in the rotational direction suffered by the image G can be eliminated.

[Patent Document 1] Japanese Patent Application Publication No. 2000-10188

However, in this conventional technique, the entire projector unit is rotated together with the rotating table, for which a large-scale adjusting mechanism and hence a large space are required. Thus, the conventional mechanism is disadvantageous in reducing not only the size and thickness of the projection television apparatus but also its cost.

SUMMARY OF THE INVENTION

The present invention has been made in view of such circumstances, and therefore, an object thereof is to provide a projection television apparatus which is capable of adjusting an image displayed on the screen out of position in a rotational direction with a simple configuration, and which is thus advantageous in reducing its size, thickness, and cost.

In order to achieve the above object, the present invention provides a projection television apparatus which includes a frame, a screen of a rear projection type attached to a front surface of the frame, and a projector unit, disposed in the frame, for emitting an image projection light beam. The projector unit includes illuminating means including a light source, image forming means for modulating light beams exiting from the illuminating means on the basis of image information whereby to generate the image projection light beam for exit therefrom, and a projection lens for projecting the image projection light beam onto the screen. An optical axis of an optical path along which the image projection light beam travels is bent with respect to an optical axis of the projection lens. In the projection television apparatus, a part extending from the image forming means to the projection lens is separated from a light source side unit which is a remaining part of the projector unit excluding the part extending from the image forming means to the projection lens, and the part extending from the image forming means to the projection lens is formed as an integrally coupled body into an image emergence side unit. A support mechanism for supporting the image emergence side unit with respect to the frame rotatably around the optical axis of the projection lens along a plane orthogonal to the optical axis is provided. An image adjusting mechanism by rotation for adjusting an angle of rotation around the optical axis of the projection lens, of the image emergence side unit is provided. A securing mechanism for loosening and tightening the image emergence side unit with respect to the frame is provided.

According to the present invention, it is configured such that only the image emergence side unit separated from the light source side unit is supported with respect to the frame rotatably around the optical axis of the projection lens along the plane orthogonal to the optical axis of the projection lens by the support mechanism, such that only the image emergence side unit is moved for adjustment by the image adjusting mechanism by rotation, and further, such that the image emergence side unit is loosened/tightened with respect to the frame by the securing mechanism.

Therefore, an image displayed on the screen out of position in a rotational direction can be adjusted easily and reliably without requiring a large-scale mechanism and thus with a simple configuration, which is hence advantageous in reducing the size, thickness, and cost.

DESCRIPTION OF THE PREFERRED EMBODIMENTS (First Embodiment)

Embodiments of a projection television apparatus according to the present invention will be described below in detail with reference to the drawings.

Figure 1A:
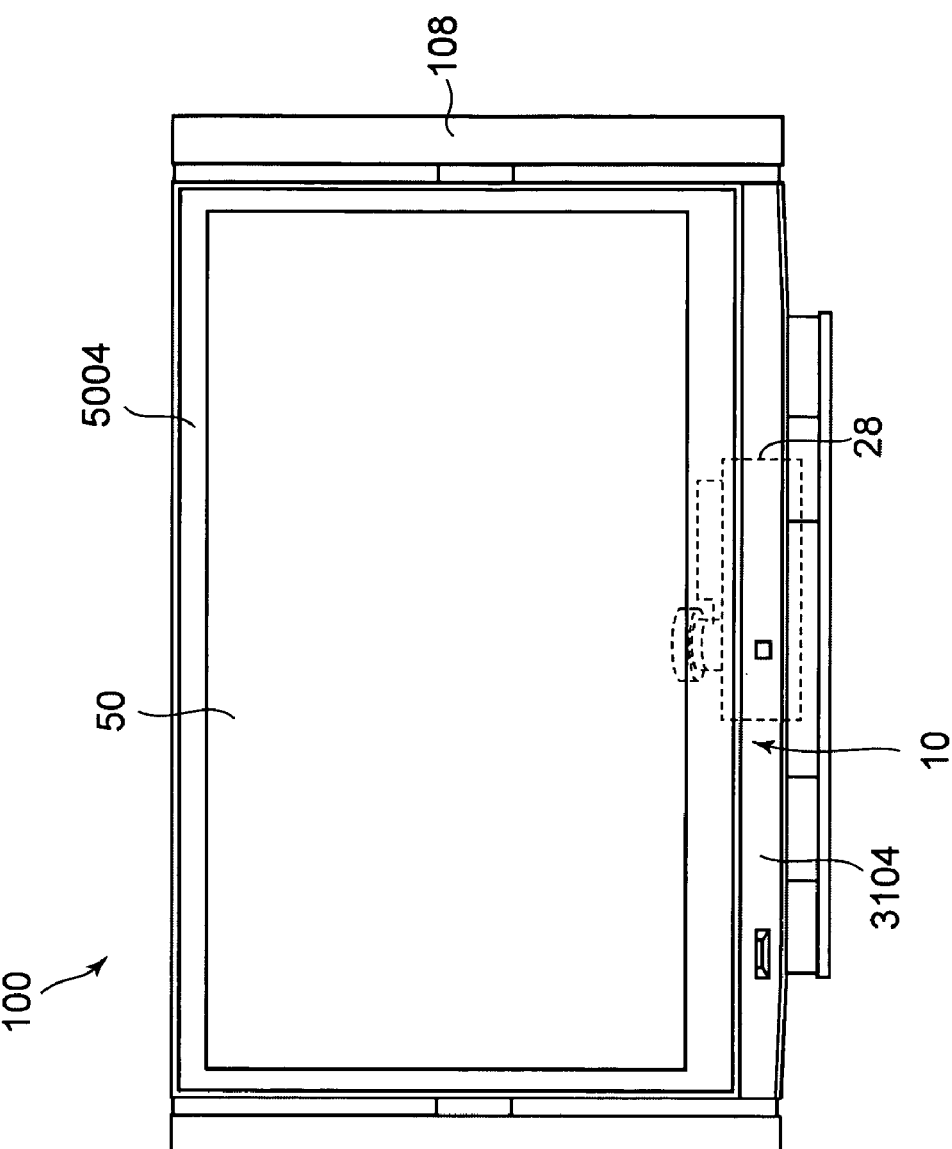
FIGS. 1A, 1B are a front view and a side view respectively showing a projection television apparatus 100 according to a first embodiment of the present invention.
Figure 1B:
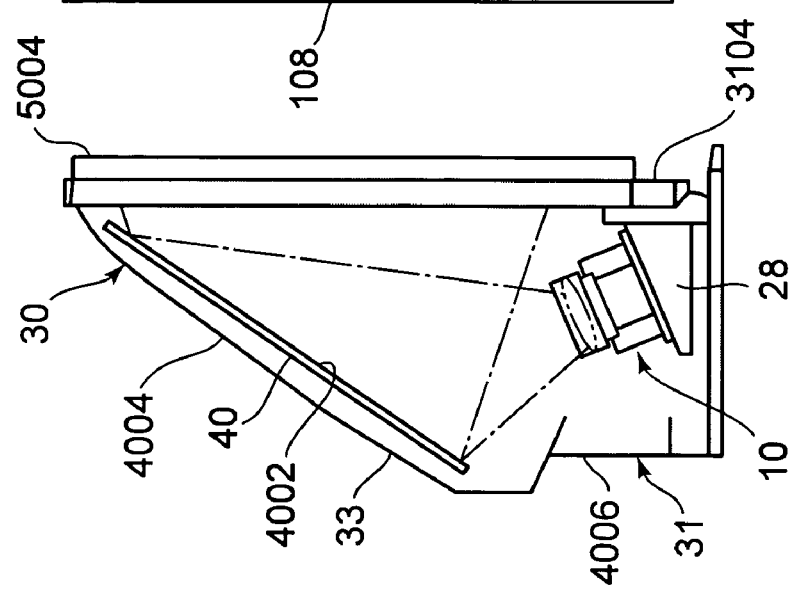

FIGS. 1A, 1B are a front view and a side view respectively showing a projection television apparatus 100 according to a first embodiment.

Figure 2:
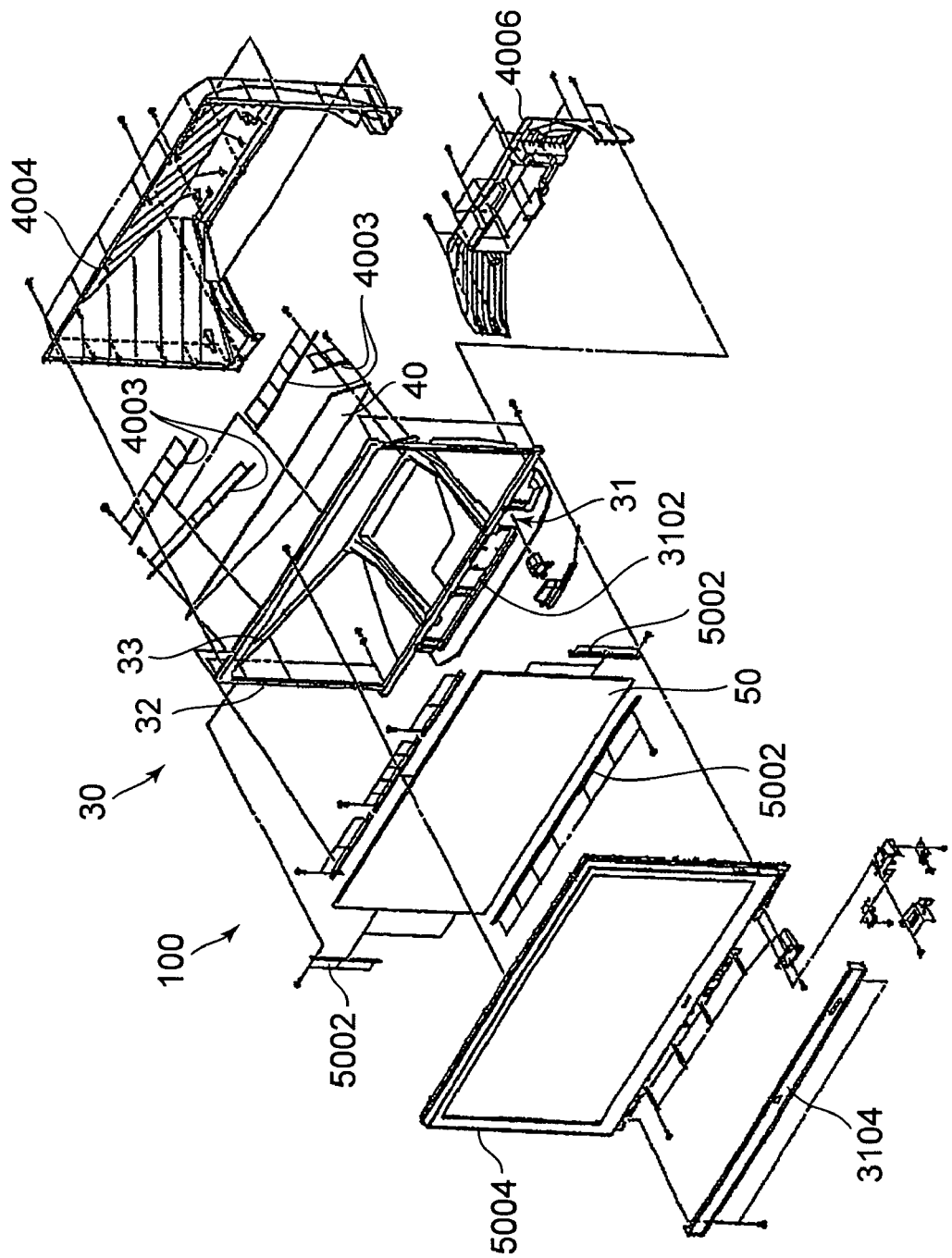
FIG. 2 is an exploded perspective view of the projection television apparatus 100.

FIG. 2 is an exploded perspective view of the projection television apparatus 100.

Figure 3:
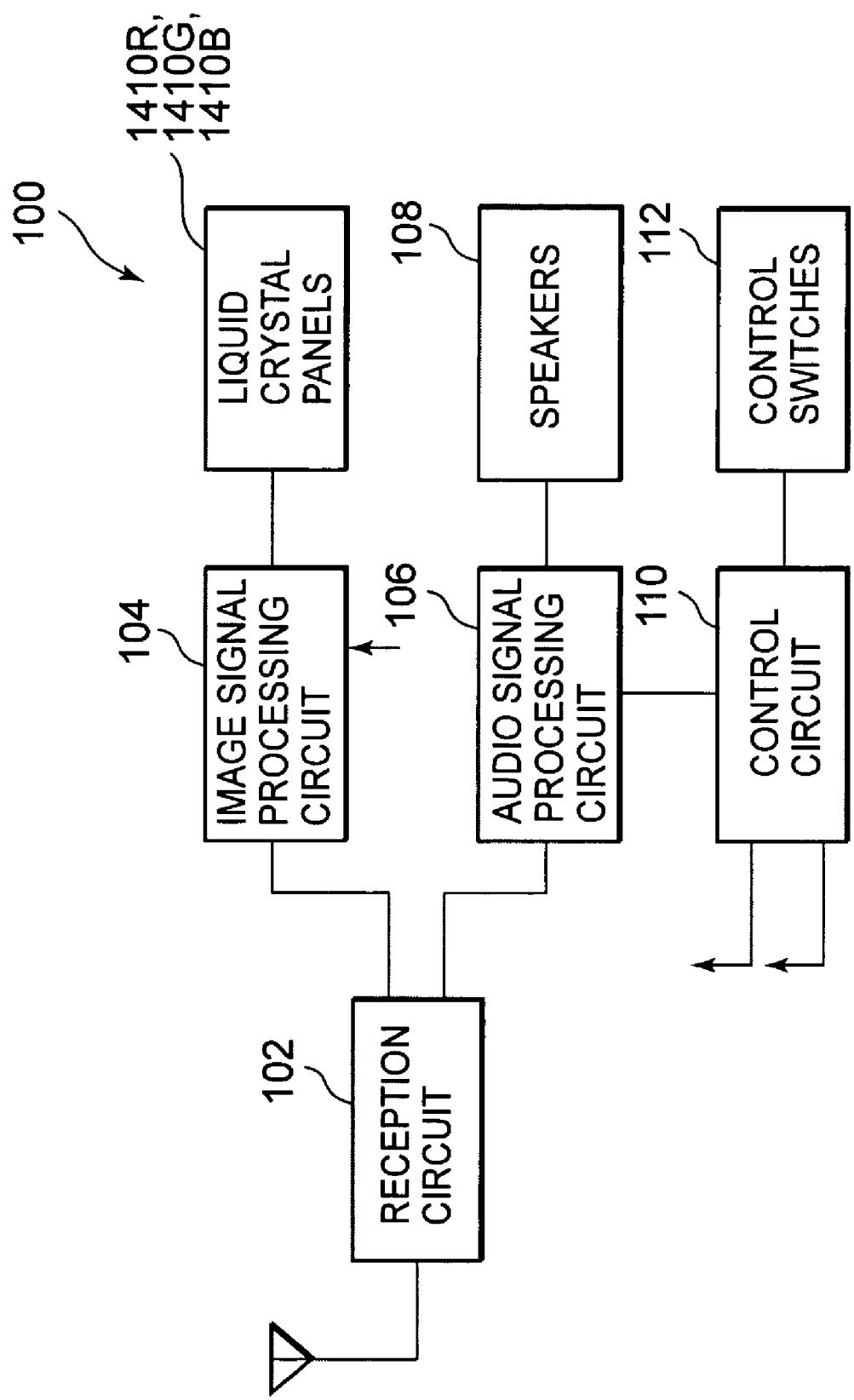
FIG. 3 is a block diagram showing a configuration of electronics of the projection television apparatus 100.

FIG. 3 is a block diagram showing a configuration of electronics of the projection television apparatus 100.

First, a configuration of the projection television apparatus 100 will be described.

As shown in FIGS. 1A, 1B, the projection television apparatus 100 includes a frame 30, and the frame 30 is provided with a projector unit 10, a reflecting mirror 40, and a rear projection screen 50.

The projector unit 10 emits an image projection light beam.

The reflecting mirror 40 has a reflecting surface 4002, disposed above the projector unit 10 and behind the rear projection screen 50, and reflects the image projection light beam emitted from the projector unit 10 onto a rear surface of the screen 50.

The screen 50 displays television images on a front surface thereof by the image projection light beam reflected by the reflecting mirror 40 being projected onto the rear surface thereof.

The screen 50 is formed of, e.g., a Fresnel lens disposed on a video source side, and a lenticular screen disposed downstream of the Fresnel lens. Furthermore, another screen may be provided for reducing contrast degradation due to external light and protecting the lenticular screen.

As shown in FIG. 2, the frame 30 includes a bottom cabinet 31 for holding the projector unit 10 therein, a rectangular frame-shaped screen mounting portion 32 disposed above the bottom cabinet 31, and an inverted trapezoidal reflecting mirror mounting portion 33 disposed above the bottom cabinet 31 and behind the screen mounting portion 32.

The screen 50 is attached to the screen mounting portion 32 via upper/lower/left/right mounting members 5002 and screws, and a frame-shaped exterior plate 5004 is also attached to the screen mounting portion 32 in a manner covering the peripheries of the mounting members 5002 and the screen 50.

Furthermore, at a front portion of the frame 30 which is below the screen mounting portion 32, a front portion 3102 of the bottom cabinet 31 is positioned, and an exterior plate 3104 is attached below the frame-shaped exterior plate 5004 in a manner covering the front portion 3102.

The reflecting mirror 40 is attached to the reflecting mirror mounting portion 33 via upper/lower/left/right mounting members 4003 and screws, and an upper rear cover 4004 is attached to the frame 30 in a manner covering the mounting members 4003 and the reflecting mirror 40.

The projector unit 10 is disposed behind the front portion 3102 of the bottom cabinet 31, and a lower rear cover 4006 is attached to the frame 30 in a manner covering the projector unit 10 and the like.

Note that in FIG. 1A, reference numeral 108 denotes left and right speakers.

Figure 4:
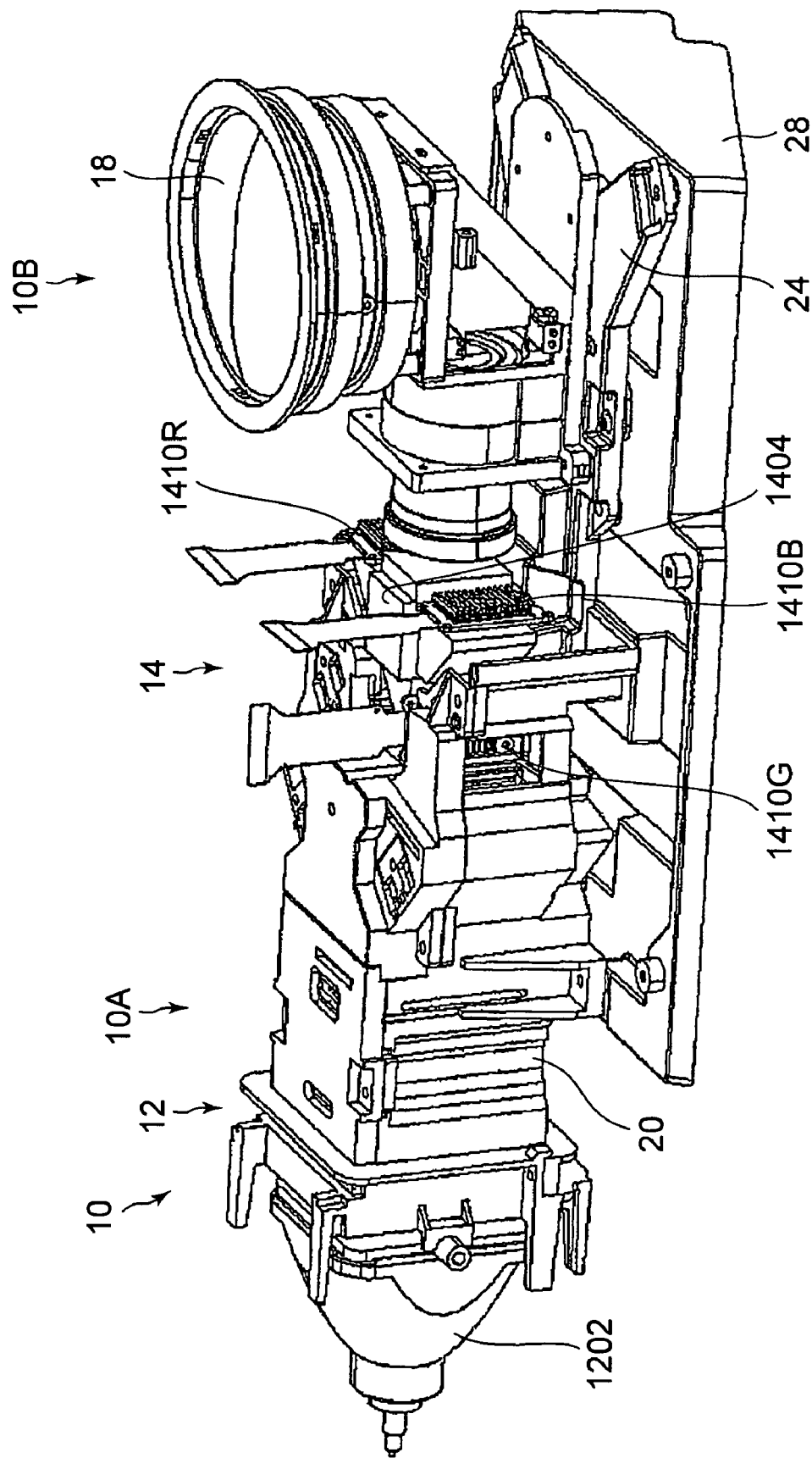
FIG. 4 is a perspective view of a projector unit 10.
Figure 5:
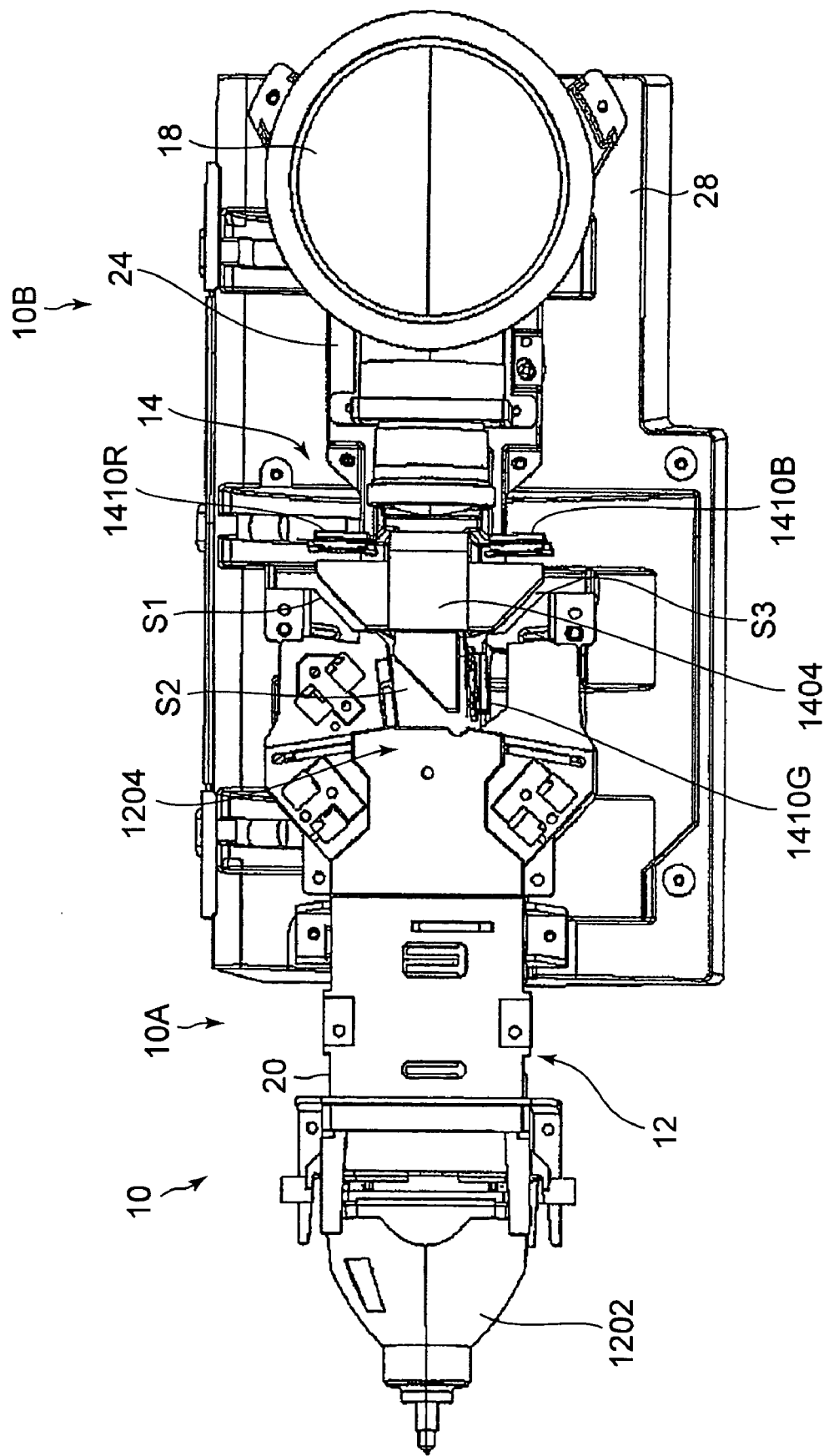
FIG. 5 is a plan view of the projector unit 10.
Figure 6:
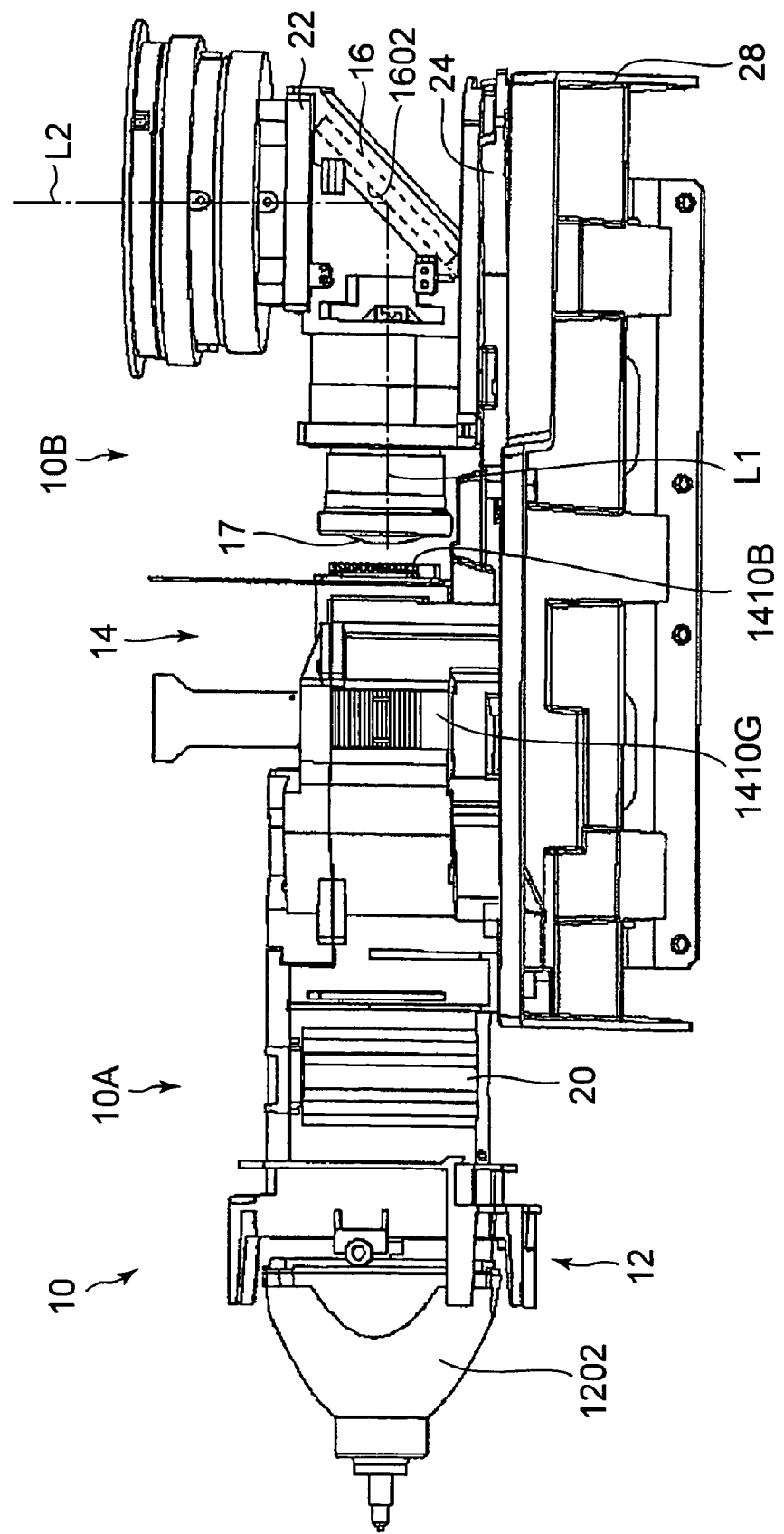
FIG. 6 is a front view of the projector unit 10.

FIG. 4 is a perspective view of the projector unit 10; FIG. 5 is a plan view of the projector unit 10; and FIG. 6 is a front view of the projector unit 10.

Figure 7:
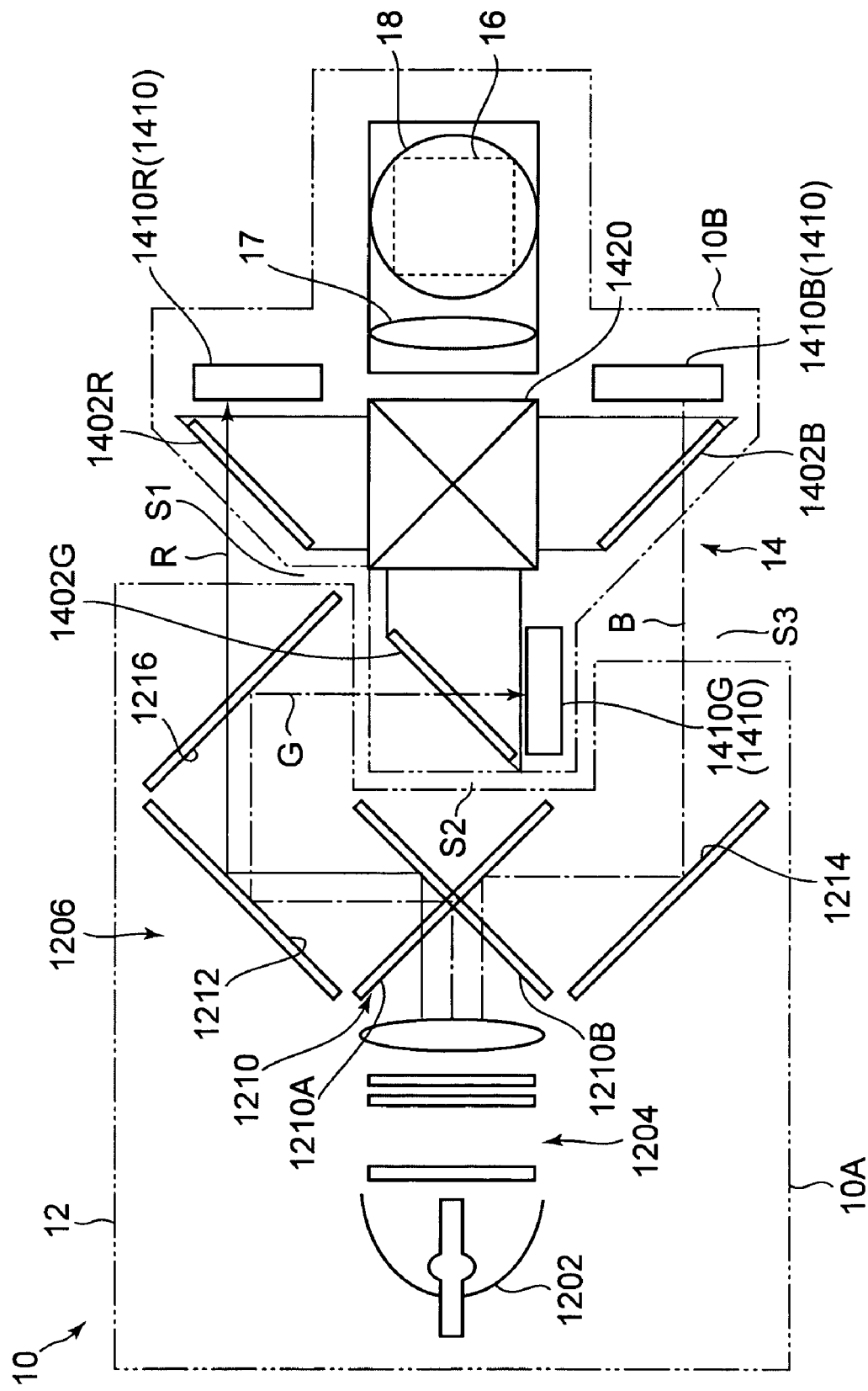
FIG. 7 is a diagram for explaining a configuration of the projector unit 10.

FIG. 7 is a diagram for explaining a configuration of the projector unit 10.

Figure 8:
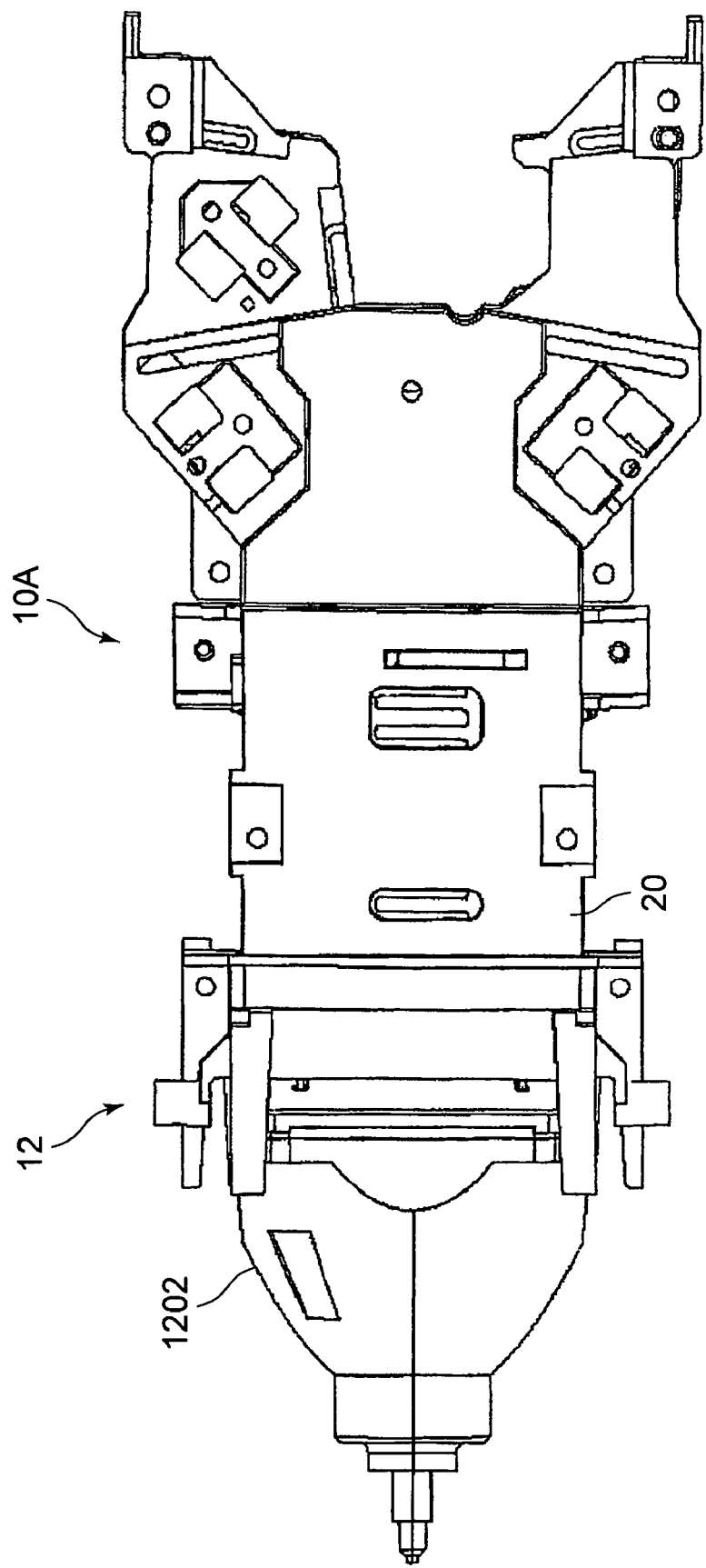
FIG. 8 is a plan view of a light source side unit 10A.
Figure 9:
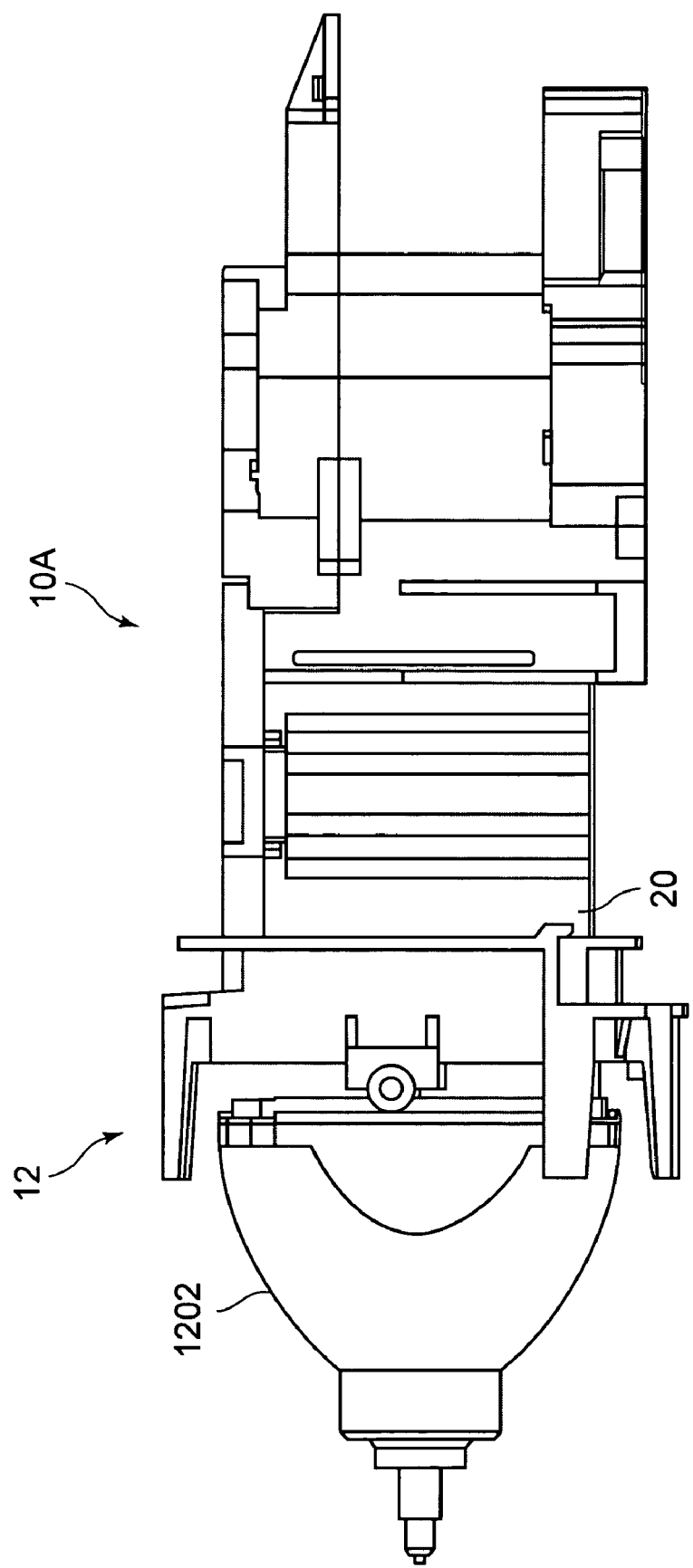
FIG. 9 is a front view of the light source side unit 10A.

FIG. 8 is a plan view of a light source side unit 10A, and FIG. 9 is a front view of the light source side unit 10A.

Figure 10:
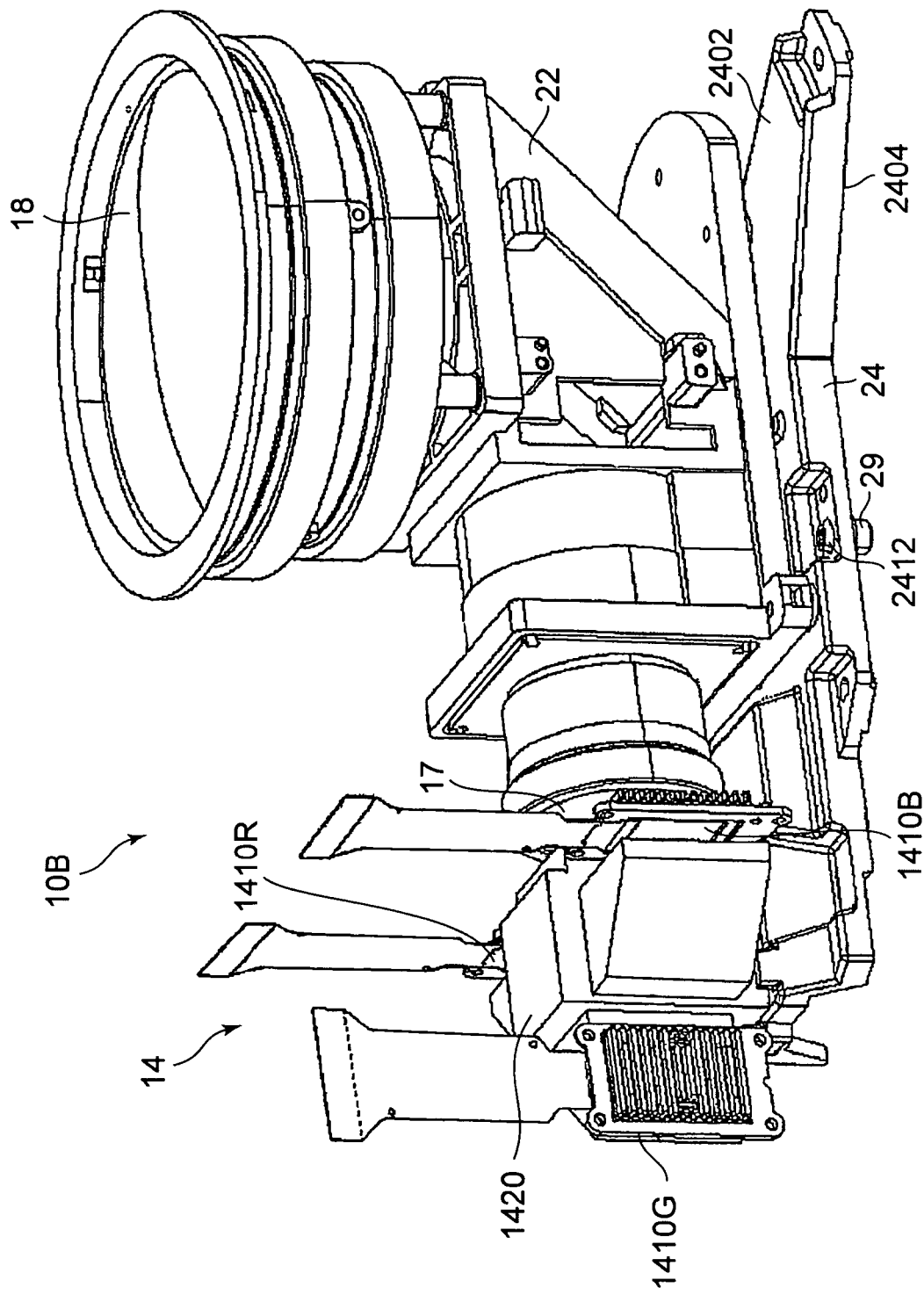
FIG. 10 is a perspective view of an image emergence side unit 10B.
Figure 11:
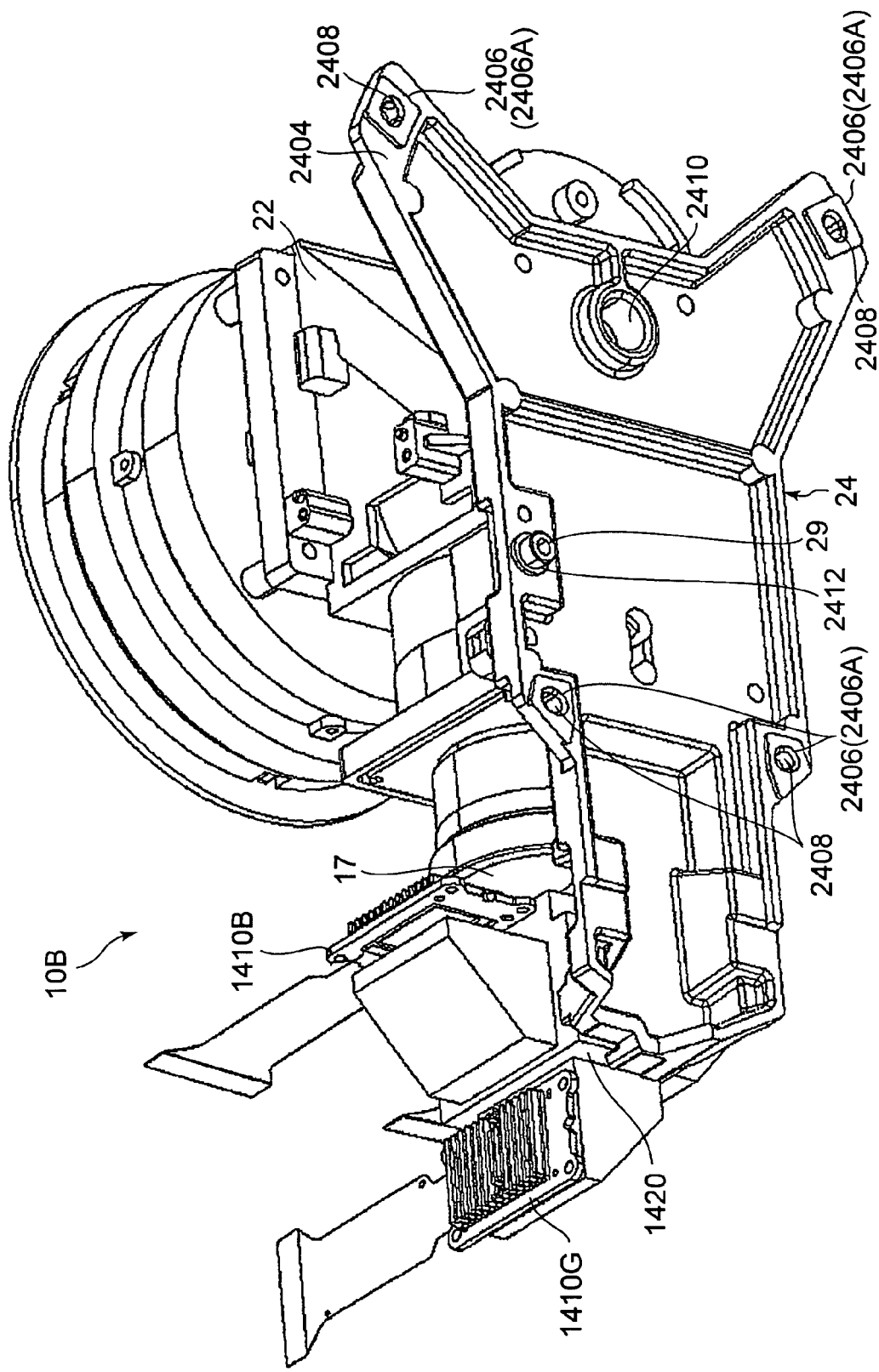
FIG. 11 is another perspective view of the image emergence side unit 10B.
Figure 12:
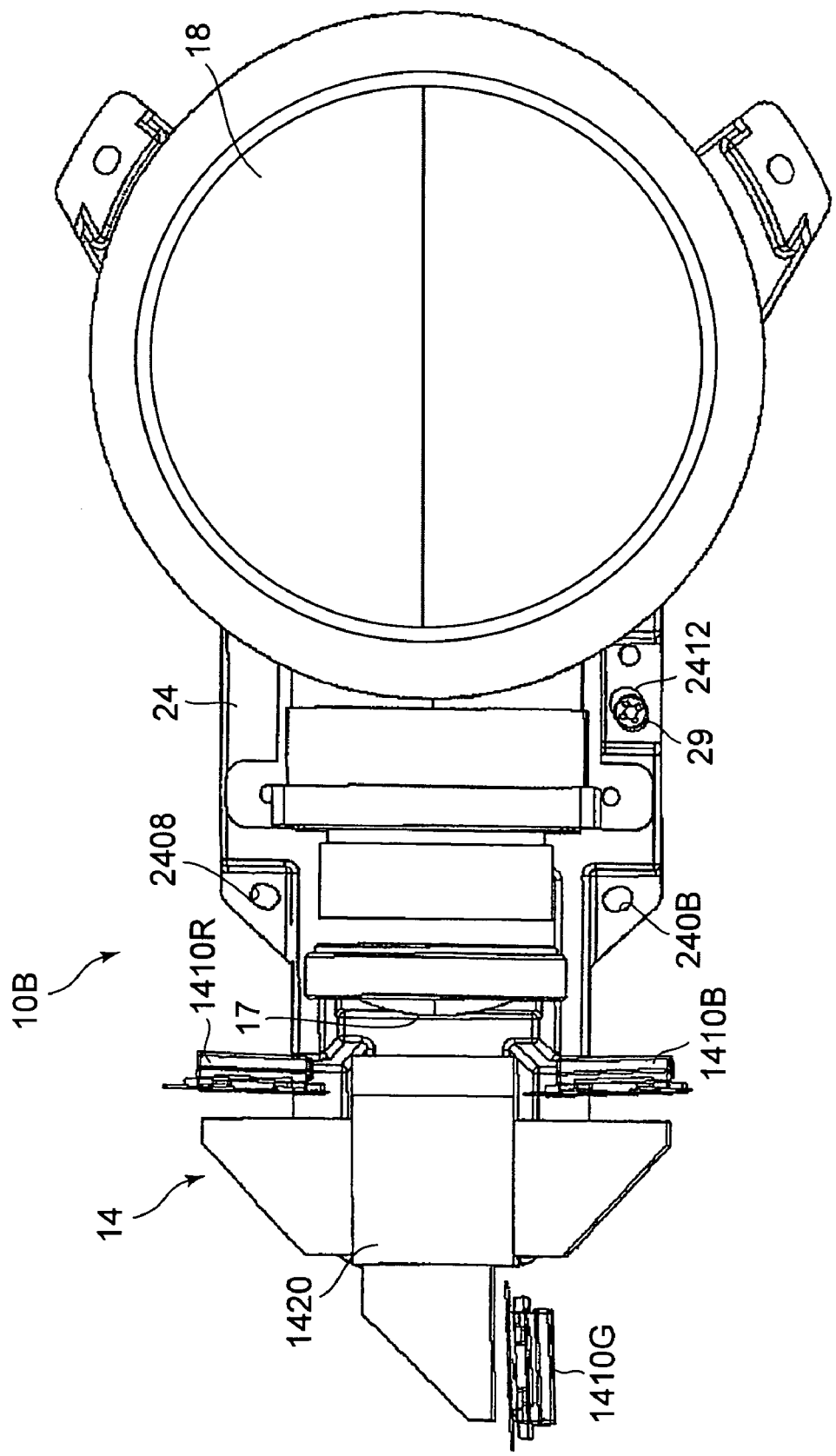
FIG. 12 is a plan view of the image emergence side unit 10B.
Figure 13:
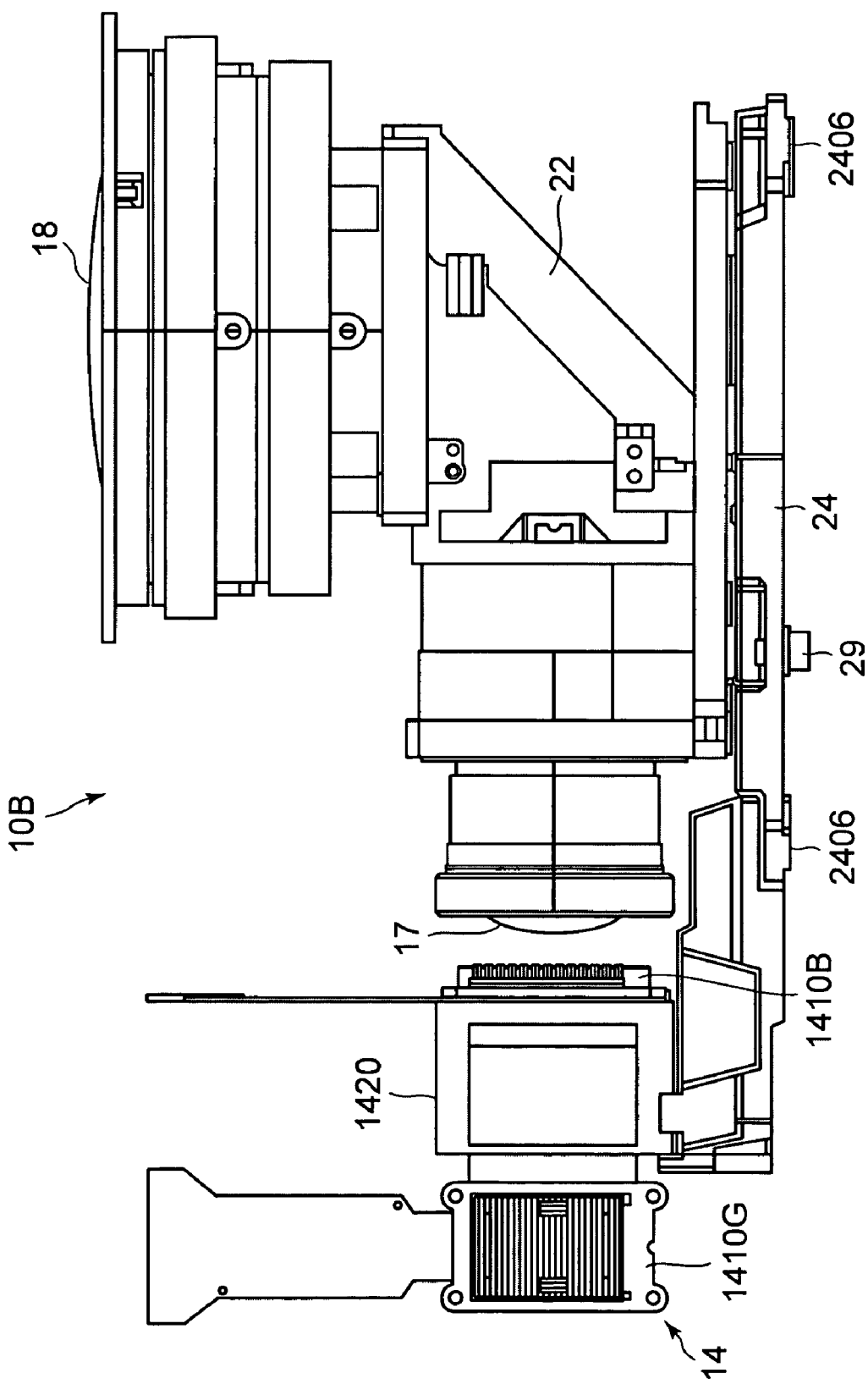
FIG. 13 is a front view of the image emergence side unit 10B.
Figure 14:
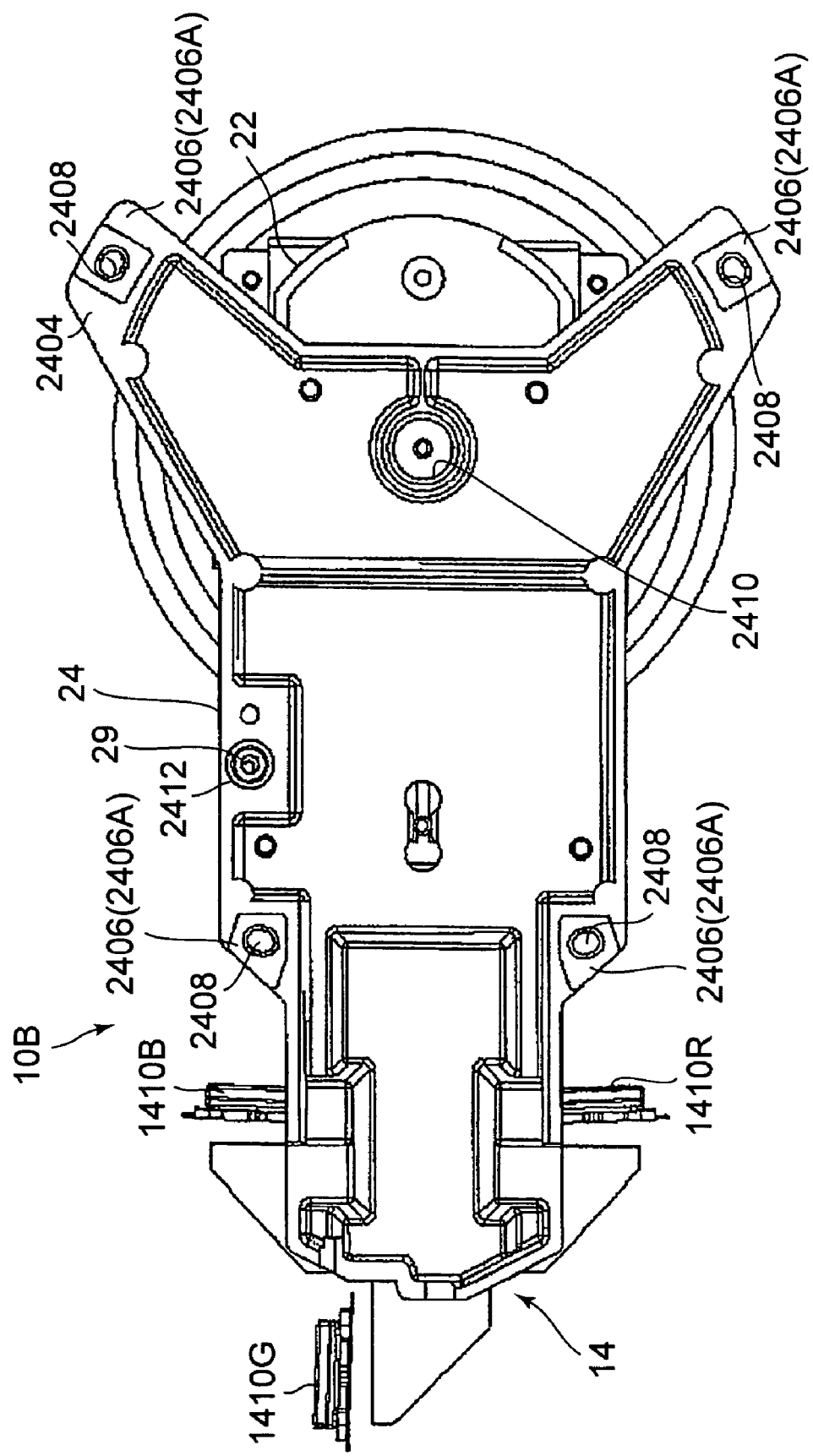
FIG. 14 is a bottom view of the image emergence side unit 10B.

FIGS. 10, 11 are perspective views of an image emergence side unit 10B; FIG. 12 is a plan view of the image emergence side unit 10B; FIG. 13 is a front view of the image emergence side unit 10B; and FIG. 14 is a bottom view of the image emergence side unit 10B.

Figure 15:
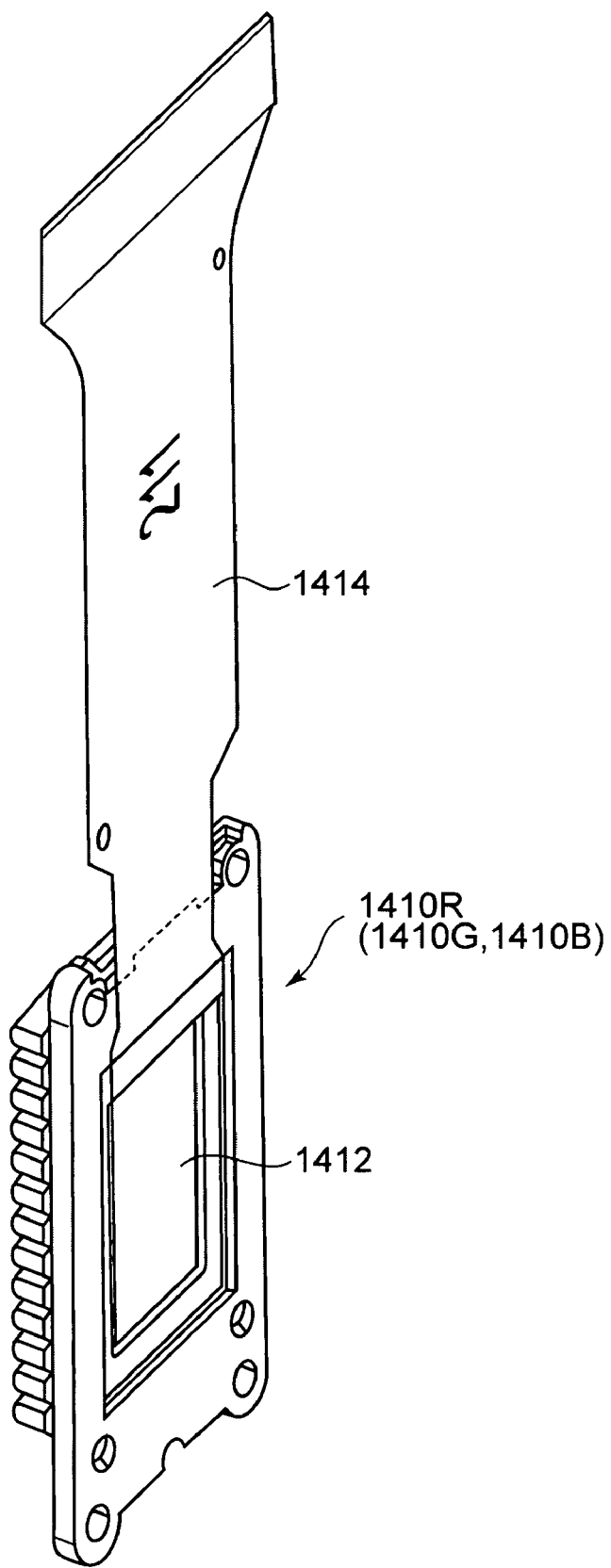
FIG. 15 is a perspective view of a liquid crystal display unit.

FIG. 15 is a perspective view of a liquid crystal display unit.

Figure 16:
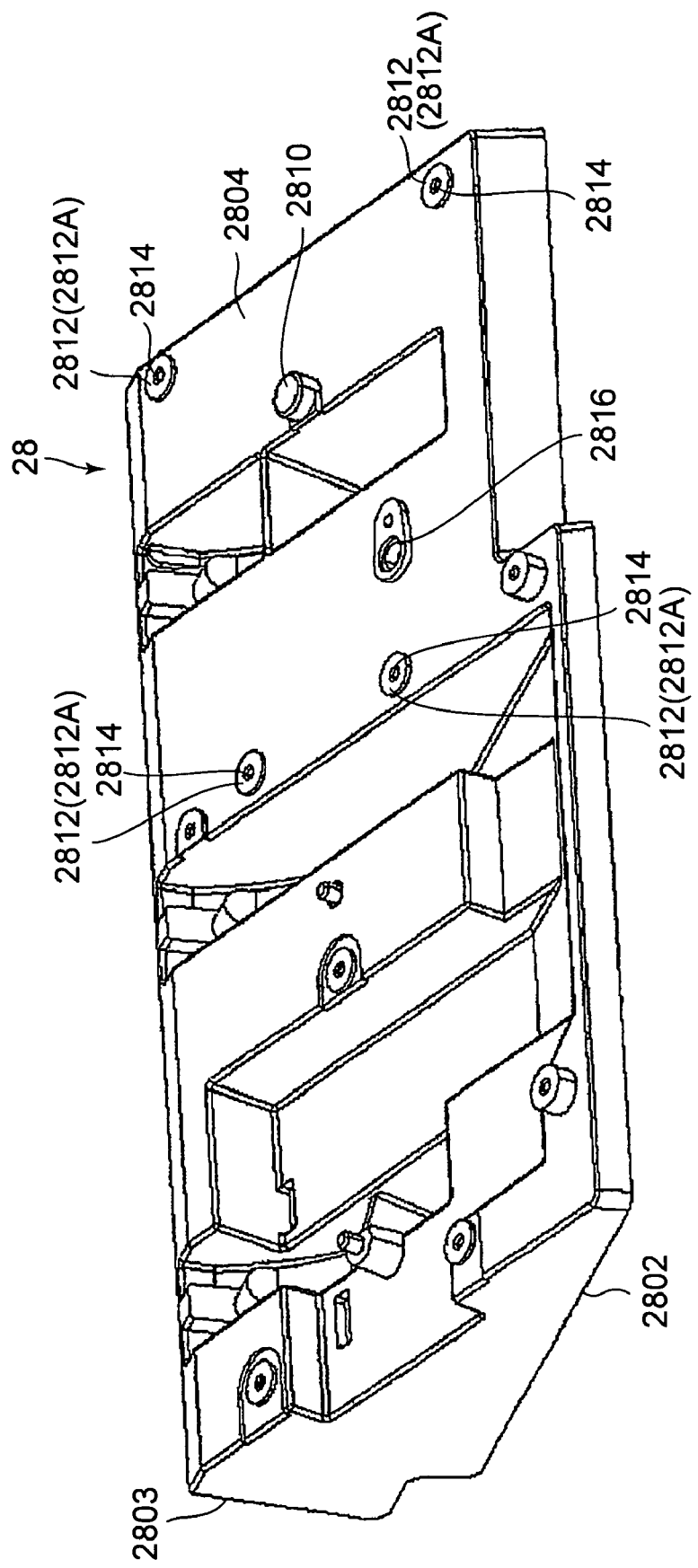
FIG. 16 is a perspective view of a base member 28.

FIG. 16 is a perspective view of a base member 28.

Figure 17:
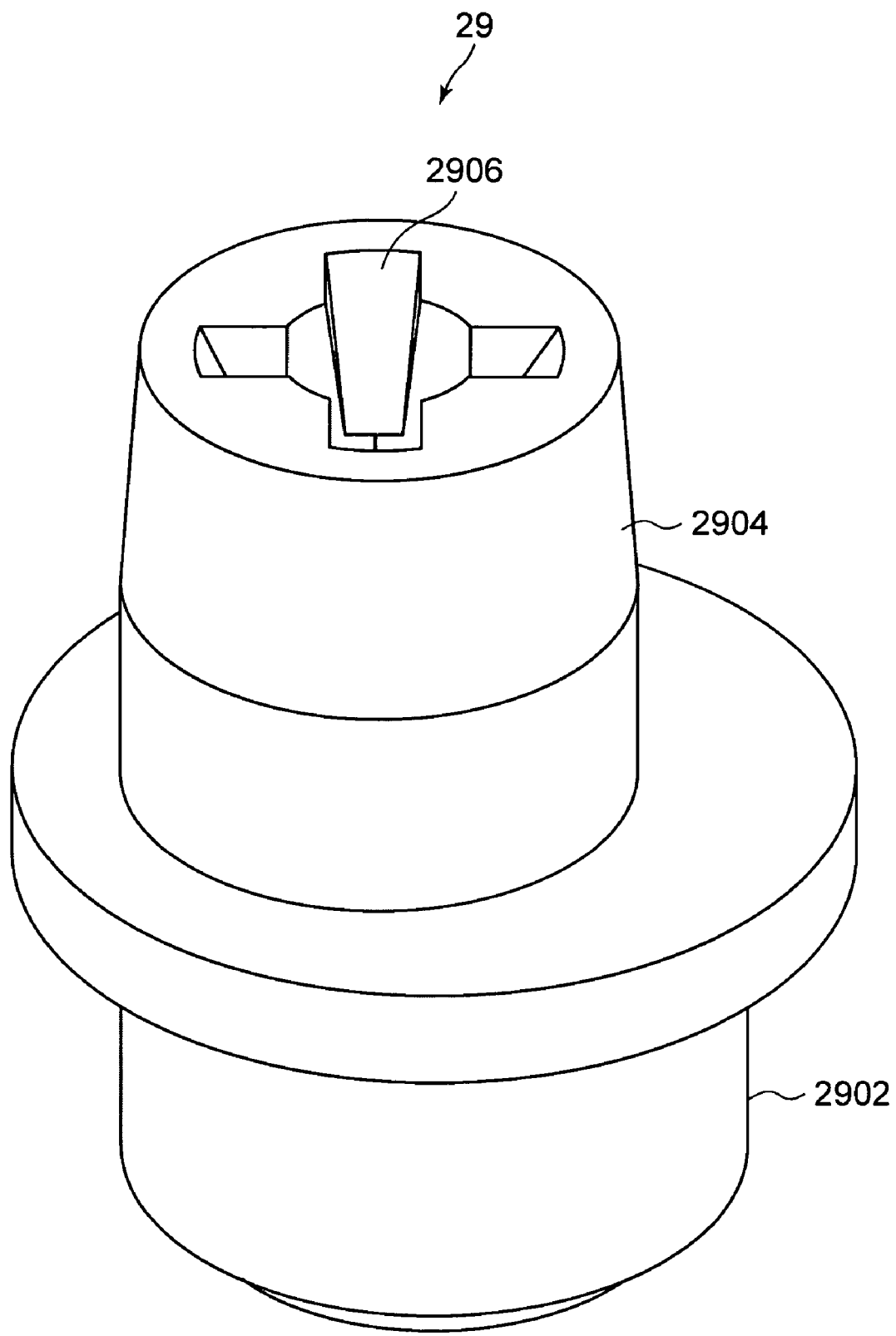
FIG. 17 is a perspective view of an eccentric pin 29.
Figure 18:
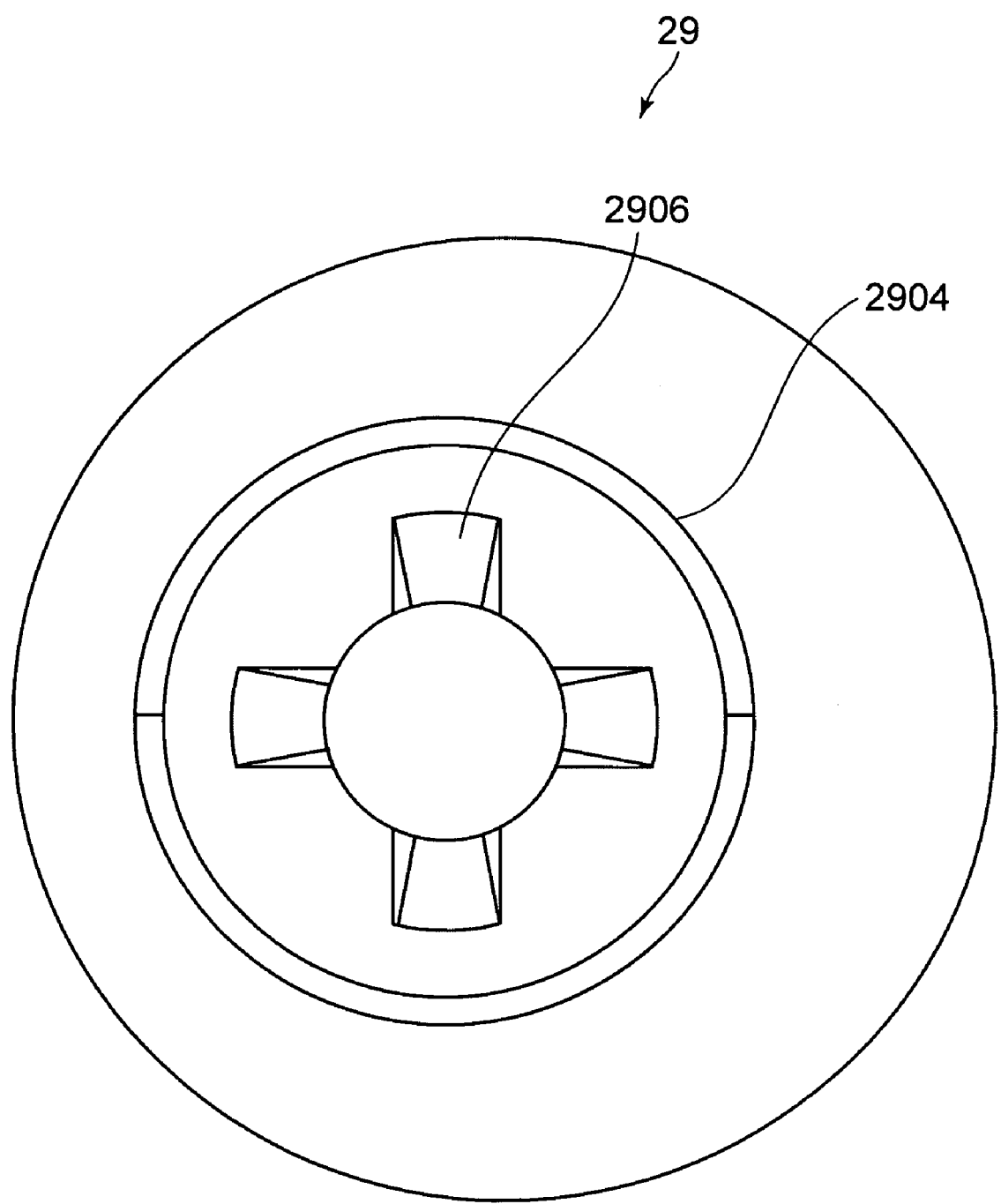
FIG. 18 is a plan view of the eccentric pin 29.
Figure 19:
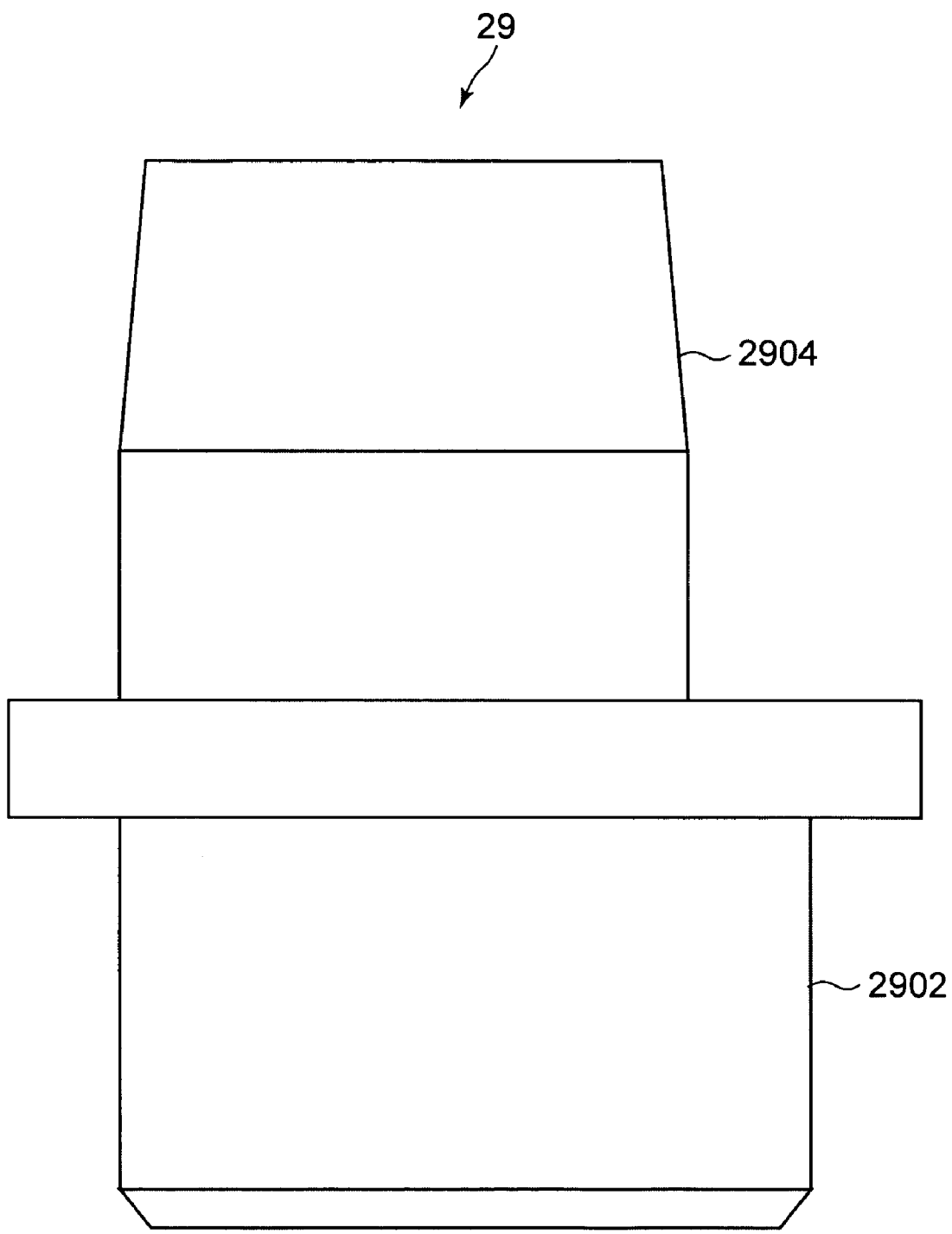
FIG. 19 is a front view of the eccentric pin 29.
Figure 20:
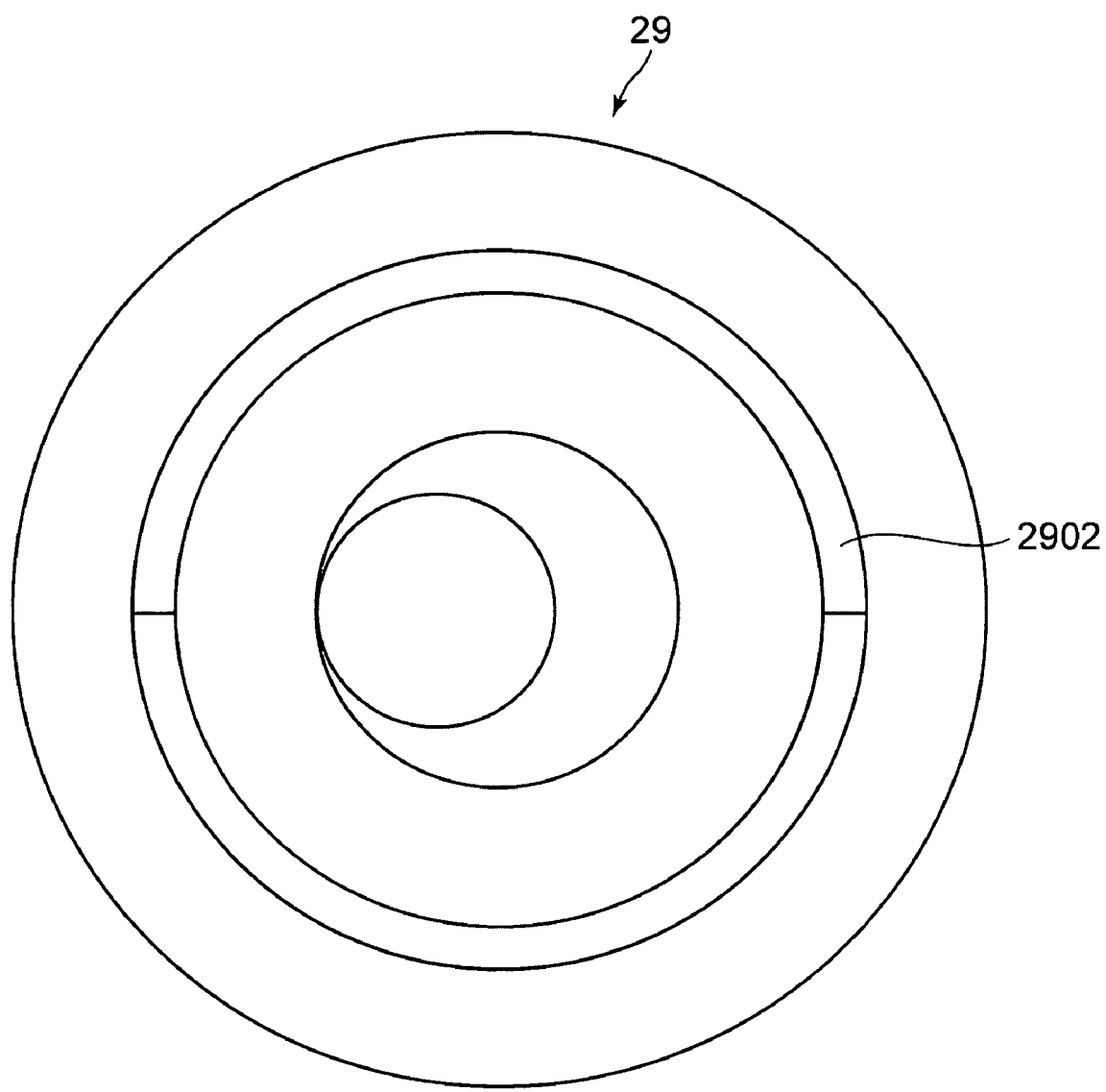
FIG. 20 is a bottom view of the eccentric pin 29.

FIG. 17 is a perspective view of an eccentric pin 29; FIG. 18 is a plan view of the eccentric pin 29; FIG. 19 is a front view of the eccentric pin 29; and FIG. 20 is a bottom view of the eccentric pin 29.

As shown in FIGS. 4-7, the projector unit 10 includes illuminating means 12, image forming means 14, a reflecting mirror 16, an incidence lens 17, and a projection lens 18.

The illuminating means 12 emits light beams for three colors, red (R), green (G), blue (B), onto the image forming means 14, and the image forming means 14 modulates the three color light beams on the basis of image information respectively corresponding to the three colors, for synthesis into a single image projection light beam. The image projection light beam is emitted onto the reflecting mirror 40 via the reflecting mirror 16 and the projection lens 18, for projection onto the rear surface of the screen 50 by the reflecting mirror 40, whereby a color image is projected on the front surface of the screen 50.

In the present embodiment, as shown in FIG. 7, the illuminating means 12 includes a light source 1202 for emitting white light, illuminating optics 1204, and color separating optics 1206, and the light source 1202, illuminating optics 1204, color separating optics 1206 are accommodated in a first housing 20.

As shown in FIGS. 8, 9, a light source side unit 10A is formed of the illuminating means 12 and the first housing 20.

As shown in FIG. 7, the illuminating optics 1204 include a concave lens, a UV cut filter, and a condenser lens which are disposed linearly in front of the light source 1202, and are configured such that the white light from the light source 1202 passes through these components to enter the color separating optics 1206.

The color separating optics 1206 separate a beam of light (white light) guided from the illuminating optics 1204 into the R, G, B three color light beams.

In the present embodiment, the color separating optics 1206 include a cross dichroic mirror 1210, first and second mirrors 1212, 1214, and a dichroic mirror 1216.

The cross dichroic mirror 1210 is formed of a dichroic mirror 1210A and a dichroic mirror 1210B coupled to each other in a manner crossing at 90°. The dichroic mirror 1210A transmits the red (R) and green (G) light beams therethrough, and reflects the blue (B) light beam, of the light beams guided from the illuminating optics 1204. The dichroic mirror 1210B reflects the red (R) and green (G) light beams, and transmits the blue (B) light beam therethrough, of the light beams guided from the illuminating optics 1204.

The dichroic mirror 1216 transmits the red (R) light beam therethrough, and reflects the green (G) light beam.

Therefore, the light beams guided from the illuminating optics 1204 to the cross dichroic mirror 1210 are separated into two groups of light beams, namely, the red (R) and green (G) light beams, and the blue (B) light beam, by the cross dichroic mirror 1210.

The red (R) and green (G) light beams separated by the cross dichroic mirror 1210 are guided to the dichroic mirror 1216 via the first mirror 1212. The dichroic mirror 1216 transmits the red (R) light beam therethrough, and reflects the green (G) light beam.

Furthermore, the blue (B) light beam separated by the cross dichroic mirror 1210 is reflected by the second mirror 1214.

In this way, the R, G, B light beams separated by the color separating optics 1206 are each emitted onto the image forming means 14 from the illuminating means 12.

As shown in FIG. 7, the image forming means 14 includes first to third beam splitters 1402R, 1402G, 1402B, three reflective liquid crystal display units (LC panels) 1410 (1410R, 1410G, 1410B) for displaying the image information for R, G, B, respectively, and a cross dichroic prism 1420 for synthesizing the light beams respectively reflected by the corresponding liquid crystal display units 1410 and thereby modulated on the basis of the corresponding three color image information to generate a single image projection light beam.

The first to third beam splitters 1402R, 1402G, 1402B, three liquid crystal display units 1410R, 1410G, 1410B, and cross dichroic prism 1420 are coupled integrally.

The first to third beam splitters 1402R, 1402G, 1402B each have a function of reflecting or transmitting light depending on a light deflecting direction.

Furthermore, as shown in FIGS. 5, 7, between the beam splitters 1402R, 1402G, 1402B of the image forming means 14 and portions of the illuminating means 12 faced by these first to third beam splitters 1402R, 1402G, 1402B are clearances S1, S2, S3, respectively, whereby the image forming means 14 does not interfere with the illuminating means 12 due to play.

As shown in FIG. 15, the liquid crystal display units 1410R, 1410G, 1410B each are rectangular plate-shaped and have a rectangular display surface 1412 for displaying an image on one of the surfaces as viewed thicknesswise, and further have a flexible board 1414 for supplying an image signal (drive signal) and power for displaying the image on the display surface 1412.

As shown in FIG. 7, the red (R) light beam exiting from the illuminating means 12 to the image forming means 14 passes through the first beam splitter 1402R to enter the red liquid crystal display unit 1410R, where the incident red light beam is reflected and thereby modulated on the basis of the corresponding image information, after which the modulated red light beam is again reflected by the first beam splitter 1402R to be guided to the cross dichroic prism 1420.

The green (G) light beam exiting from the illuminating means 12 to the image forming means 14 passes through the second beam splitter 1402G to enter the green liquid crystal display unit 1410G, where the incident green light beam is reflected and thereby modulated on the basis of the corresponding image information, after which the modulated green light beam is again reflected by the second beam splitter 1402G to be guided to the cross dichroic prism 1420.

The blue (B) light beam exiting from the illuminating means 12 to the image forming means 14 passes through the third beam splitter 1402B to enter the blue liquid crystal display unit 1410B, where the incident blue light beam is reflected and thereby modulated on the basis of the corresponding image information, after which the modulated blue light beam is again reflected by the second beam splitter 1402B to be guided to the cross dichroic prism 1420.

The three color light beams guided to the cross dichroic prism 1420 are synthesized by the cross dichroic prism 1420 into a single image projection light beam.

Note that the example in which the image forming means 14 is formed of the first to third beam splitters 1402R, 1402G, 1402B, three reflective liquid crystal display units 1410R, 1410G, 1410B, and cross dichroic prism 1420 has been described in the present embodiment, the image forming means 14 is not limited to this embodiment, but may, of course, include various known configurations.

In the present embodiment, as shown in FIG. 6, the reflecting mirror 16, incidence lens 17, and projection lens 18 are assembled into a second housing 22.

The second housing 22 is integrally coupled to a support block 24, and so is the image forming means 14.

These reflecting mirror 16, incidence lens 17, projection lens 18, second housing 22, and image forming means 14 form an image emergence side unit 10B. The image emergence side unit 10B and the light source side unit 10A are independent bodies. The former is separated from the latter.

In other words, a part extending from the image forming means 14 to the projection lens 18 is separated from the light source side unit 10A which is a remaining part of the projector unit 10 excluding the part extending from the image forming means 14 to the projection lens 18, and the components in the part extending from the image forming means 14 to the projection lens 18 are integrally coupled to form the image emergence side unit 10B.

The incidence lens 17 is a lens into which the above-mentioned image projection light beam guided from the cross dichroic prism 1420 enters.

The reflecting mirror 16 is disposed such that a reflecting surface 1602 thereof slopes up to form an angle of 45° with an optical axis of the incidence lens 17.

The projection lens 18 is disposed above the reflecting mirror 16 such that an optical axis thereof forms an angle of 45° with the reflecting surface 1602.

That is, as shown in FIG. 6, an optical path of the image projection light beam extending from the image forming means 14 to the projection lens 18 is formed of a first optical path L1 linearly extending from the image forming means 14, a second optical path L2 aligned with the optical axis of the projection lens 18, and the reflecting surface 1602, disposed at a location where these optical paths L1, L2 cross, for bending these optical paths L1, L2. An angle which the first optical path L1 forms with the second optical path L2 equals 90°.

Therefore, the image projection light beam guided from the cross dichroic prism 1420 is bent 90° upwards by the reflecting surface 1602 through the incidence lens 17, enters the reflecting mirror 40 via the projection lens 18, and then is projected for image formation onto the rear surface of the screen 50 by the reflecting mirror 40, whereby a color image is formed on the front surface of the screen 50.

As shown in FIGS. 10-13, the support block 24 has a length extending from the image forming means 14 to the projection lens 18, and the image forming means 14 and the second housing 22 are attached to an upper surface 2402 of the support block 24.

A lower surface 2404 of the support block 24 has a bearing hole 2410 formed therein, and also, mounting seats 2406 are formed at four lower surface 2404 locations around the bearing hole 2410, in a manner protruding from the lower surface 2404. Lower surfaces of these mounting seats 2406 are formed as supported surfaces 2406A to be supported by the frame 30.

In the mounting seats 2406, there are formed elongated holes 2408 which circumferentially extend around the bearing hole 2410.

Also, an eccentric pin insertion hole 2412 is formed at a support block 24 location distant from the bearing hole 2410.

Electronics of the projection television apparatus 100 will be described.

As shown in FIG. 3, the projection television apparatus 100 includes a reception circuit 102, an image signal processing circuit 104, an audio signal processing circuit 106, the speakers 108, a control circuit 110, control switches 112, and also the above-mentioned liquid crystal display units 1410R, 1410G, 1410B.

The reception circuit 102 selects channels on the basis of commands from the control circuit 110, demodulates a television signal received via an antenna, and separates the signal into an image signal and a sound signal for output.

The image signal processing circuit 104 performs necessary signal processing on the image signal to generate image information for R, G, B, and supplies image signals (drive signals) corresponding to the image information to the three liquid crystal display units 1410R, 1410G, 1410B, respectively.

The audio signal processing circuit 106 performs necessary signal processing and amplification processing on the sound signal to -generate an audio signal for supply to the speakers 108. As a result, sounds are outputted from the speakers 108.

The control switches 112 serve to perform various control and setting involved to view broadcasts by the projection television apparatus 100. For example, a channel selection switch, a volume control switch, an input selection switch, and the like are included.

The control circuit 110 controls the reception circuit 102, image signal processing circuit 104, and audio signal processing circuit 106 on the basis of control by the corresponding control switches 112.

Although not shown, there are also provided external input terminals for inputting image and sound signals supplied from an external apparatus, such as a DVD player or a videocassette recorder, and an input switching circuit for inputting by switching the image and sound signals supplied to these external input terminals, to the image signal processing circuit 104 and the audio signal processing circuit 106, respectively.

It is configured such that the image and sound signals supplied to the external input terminals are fed to the image signal processing circuit 104 and the audio signal processing circuit 106 via the input switching circuit through control by the corresponding control switch 112.

As shown in FIG. 1, the projector unit 10 is attached to the frame 30 via a base member 28. More specifically, both the light source side unit 10A and the image emergence side unit 10B are attached to the base member 28, and are attached to the frame 30 via the base member 28. In other words, both the first housing 20 and the support block 24 are attached to the frame 30 via the base member 28.

As shown in FIG. 16, the base member 28 includes a bottom surface 2802 facing the bottom of the frame 30, an upper surface 2804 so sloping with respect to the bottom surface 2802 as to face an obliquely upper rear portion of the frame 30, and a front surface 2803 uniting the bottom surface 2802 and the upper surface 2804.

The base member 28 is secured by screws to the bottom cabinet 31 (frame 30) at its front surface 2803.

A shaft 2810 coaxial with the optical axis of the projection lens 18 projects from the upper surface 2804 of the base member 28, i.e., from the frame 30 side. Four bosses 2812 project at four upper surface 2804 locations around the shaft 2810. Upper faces of these bosses 2812 are formed as support surfaces 2812A extending along a plane orthogonal to the optical axis of the projection lens 18.

In the present embodiment, a screw hole 2814 is formed in the center of each of the bosses 2812.

Furthermore, an eccentric pin insertion hole 2816 is formed at a base member 28 location corresponding to the eccentric pin insertion hole 2412 of the support block 24.

The support block 24 is attached to the base member 28 as follows.

As shown in FIGS. 11, 16, the lower surface 2404 of the support block 24 is arranged to face the upper surface 2804 of the base member 28, to insert the shaft 2810 of the base member 28 into the bearing hole 2410 of the support block 24, and also to place the mounting seats 2406 of the support block 24 on the corresponding bosses 2812 of the base member 28.

As a result, the supported surfaces 2406A of the support block 24 are placed on the corresponding support surfaces 2812A of the base member 28, whereby the elongated holes 2408 of the support block 24 face the corresponding screw holes 2814 of the base member 28, respectively.

Here, an eccentric pin 29 is inserted through the eccentric pin insertion hole 2412 of the support block 24 into the eccentric pin insertion hole 2816 of the base member 28.

As shown in FIGS. 17-20, the eccentric pin 29 is formed of a first shaft portion 2902, a second shaft portion 2904 having an axis off-center with respect to an axis of the first shaft portion 2902 and connected to an end portion of the first shaft portion 2902, and a manipulation portion 2906 for rotational operation provided in an end portion of the second shaft portion 2904 and engageable with a tool such as a Phillips screwdriver, a hex wrench.

The eccentric pin 29 has its first shaft portion 2902 inserted into the eccentric pin insertion hole 2816 of the base member 28, whereby the first shaft portion 2902 extends in parallel with the optical axis of the projection lens 18 and is thus supported by the eccentric pin insertion hole 2816 so as to be rotatable around its axis.

Furthermore, the second shaft portion 2904 is inserted into the eccentric pin insertion hole 2412 of the support block 24, whereby the second shaft portion 2904 is supported by the eccentric insertion hole 2412 rotatably around its axis.

Through rotation of this eccentric pin 29, later-described image adjustment by rotation is made, and after completing the image adjustment by rotation, the support block 24 is fixed to the base member 28 through bolts (claimed screw members), each having passed through the corresponding elongated hole 2408 to be screwed into the corresponding screw hole 2814 with male screw threads formed at its distal end portion, whereby the projector unit 10 is attached to the frame 30.

Next, the image adjustment by rotation using the eccentric pin 29 will be described.

Let FIG. 22 be used here again. When the image G projected onto the screen 6 by the projector unit 10 is skewed with respect to the screen 6 as shown by the broken line, first the bolts inserted through the elongated holes 2408 to be screwed into the screw holes 2814 are loosened to make the image emergence side unit 10B rotatable.

Then, by properly holding the tool to the manipulation portion 2906 of the eccentric pin 29, the eccentric pin 29 is rotated.

As the eccentric pin 29 rotates, the second shaft portion 2904 of the eccentric pin 29 rotates around the first shaft portion 2902, whereby the support block 24 is oscillated around the shaft 2810 as a fulcrum with the supported surfaces 2406A sliding over the corresponding support surfaces 2812A of the base member 28, respectively, whereby an angle of rotation around the optical axis of the projection lens 18 of the image emergence side unit 10B is adjusted.

Figure 22:
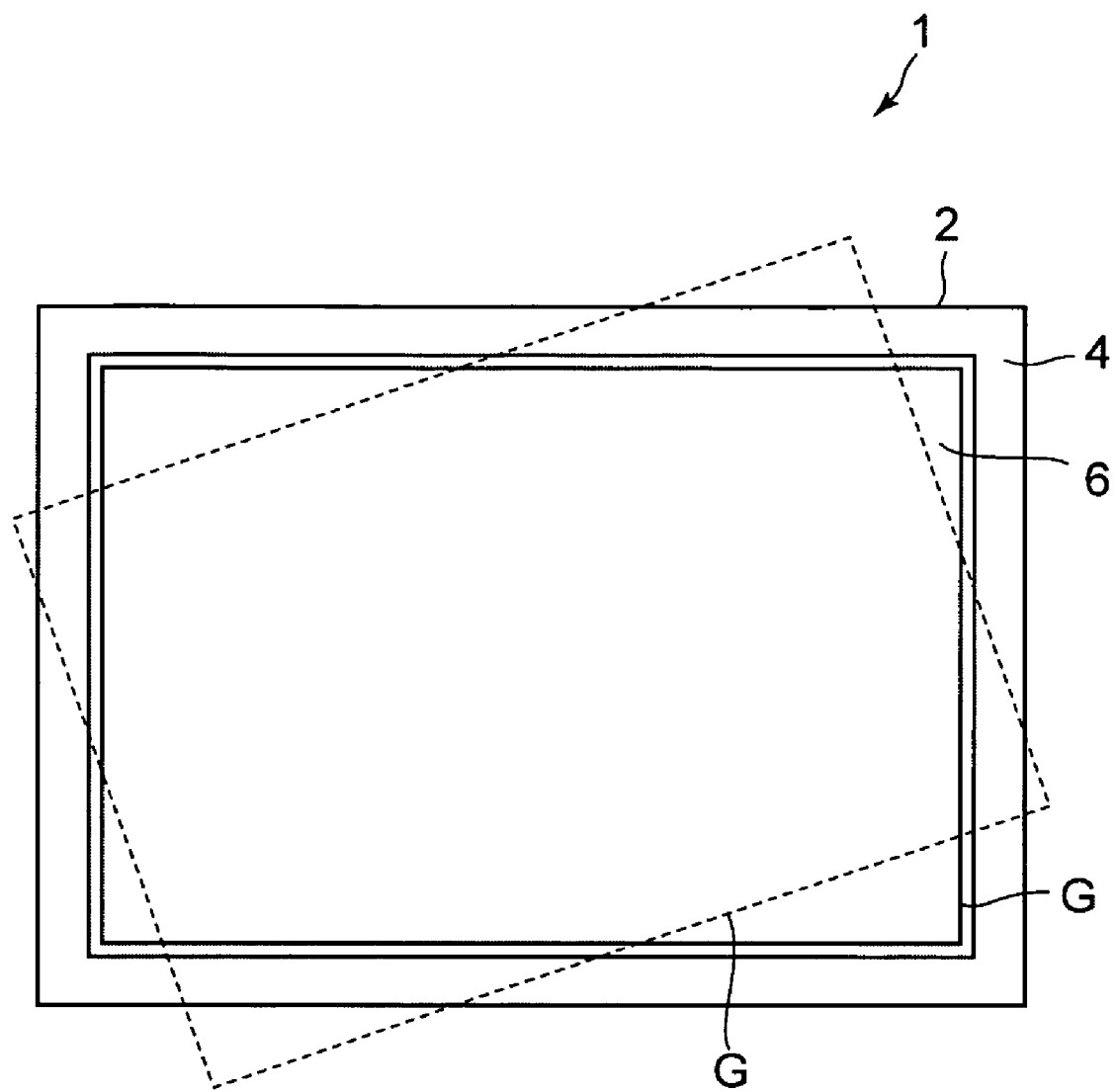
FIG. 22 is a front view of a conventional projection television apparatus.

Therefore, as a result of such rotation of the eccentric pin 29, the rotation angle of the image emergence side unit 10B is adjusted such that the image G is no longer skewed on the screen 6 as shown by the solid line in FIG. 22 (i.e., such that the four sides of the image G parallel the corresponding four sides of the screen 6, respectively).

After the adjustment, the bolts inserted through the elongated holes 2408 are tightened to fix the angle of rotation around the optical axis of the projection lens 18 of the image emergence side unit 10B.

With this operation, the image adjustment by rotation ends.

Note that a support mechanism for supporting the image emergence side unit 10B with respect to the frame 30 rotatably around the optical axis of the projection lens 18 along the plane orthogonal to the optical axis is formed of the shaft 2810 provided on the base member 28 and the bearing hole 2410 provided in the support block 24.

Furthermore, an image adjusting mechanism by rotation for adjusting the angle of rotation around the optical axis of the projection lens 18 of the image emergence side unit 10B is formed of the eccentric pin 29 and the eccentric pin insertion holes 2412, 2816.

Furthermore, a securing mechanism for loosening and tightening the image emergence side unit 10B with respect to the frame 30 is formed of the elongated holes 22408, screw holes 2814, and the bolts.

According to the present embodiment, it is configured such that only the image emergence side unit 10B separated from the light source side unit 10A is supported with respect to the frame 30 rotatably around the optical axis of the projection lens 18 along the plane orthogonal to the optical axis by the support mechanism, and such that the only the image emergence side unit 10B is moved for adjustment by the image adjusting mechanism by rotation, and further, such that the image emergence side unit 10B is loosened and tightened with respect to the frame 30 by the securing mechanism.

Therefore, without requiring a large-scale mechanism for moving the entire projector unit 10 as in the conventional example, an image displayed on the screen out of position in the rotational direction can be adjusted easily and reliably with a simple configuration, which is thus advantageous in reducing the size, thickness, and cost.

Furthermore, since only the image emergence side unit 10B is moved for adjustment, it requires only an extremely small space for the movement compared with the adjustment by moving the entire projector unit 10 as in the conventional example, which is thus advantageous in reducing the size and thickness of the projection television apparatus 100.

Furthermore, since the image emergence side unit 10B is lightweight compared with the entire projector unit 10, force required for rotational adjustment of the image is also small, which thus reduces the labors of an operator and also increases efficiency of the image adjusting operation performed before shipment and after installation, and hence is extremely advantageous in reducing the cost of the projection television apparatus 100.

Note that the image adjusting mechanism by rotation is not limited to the one using the eccentric pin, but may include any known mechanism, such as a link mechanism and a gear mechanism. However, use of the eccentric pin 29 is advantageous in simplifying the structure and reducing the cost.

Furthermore, the angle which the first optical path L1 forms with the second optical path L2 is not limited to 90°, but may include other angles as well.

Furthermore, while the case where the support mechanism is configured by providing the shaft 2810 on the base member 28 and the bearing hole 2410 in the support block 24 has been described in the embodiment, it may, of course, be configured such that the bearing hole is provided in the base member 28 and the shaft on the support block 24.

Furthermore, the case where the support mechanism for supporting the image emergence side unit 10B with respect to the frame 30 rotatably around the optical axis of the projection lens 18 along the plane orthogonal to the optical axis is formed of the shaft 2810 and the bearing hole 2410 has been described in the embodiment. However, various known structures may also be adoptable. For example, the image emergence side unit 10B is provided with a supported surface, which is a closed cylindrical surface formed around the optical axis of the projection lens 18, and the frame 30 is provided with a support surface fitted into the supported surface. However, the configuration of the embodiment is advantageous in simplifying the structure and reducing the cost.

(Second Embodiment)

In the first embodiment, the case where the image forming means 14 is configured by use of reflective liquid crystal display units has been described. In a second embodiment, a case of using transmissive liquid crystal display units as the image forming means 14 will be described.

Figure 21:
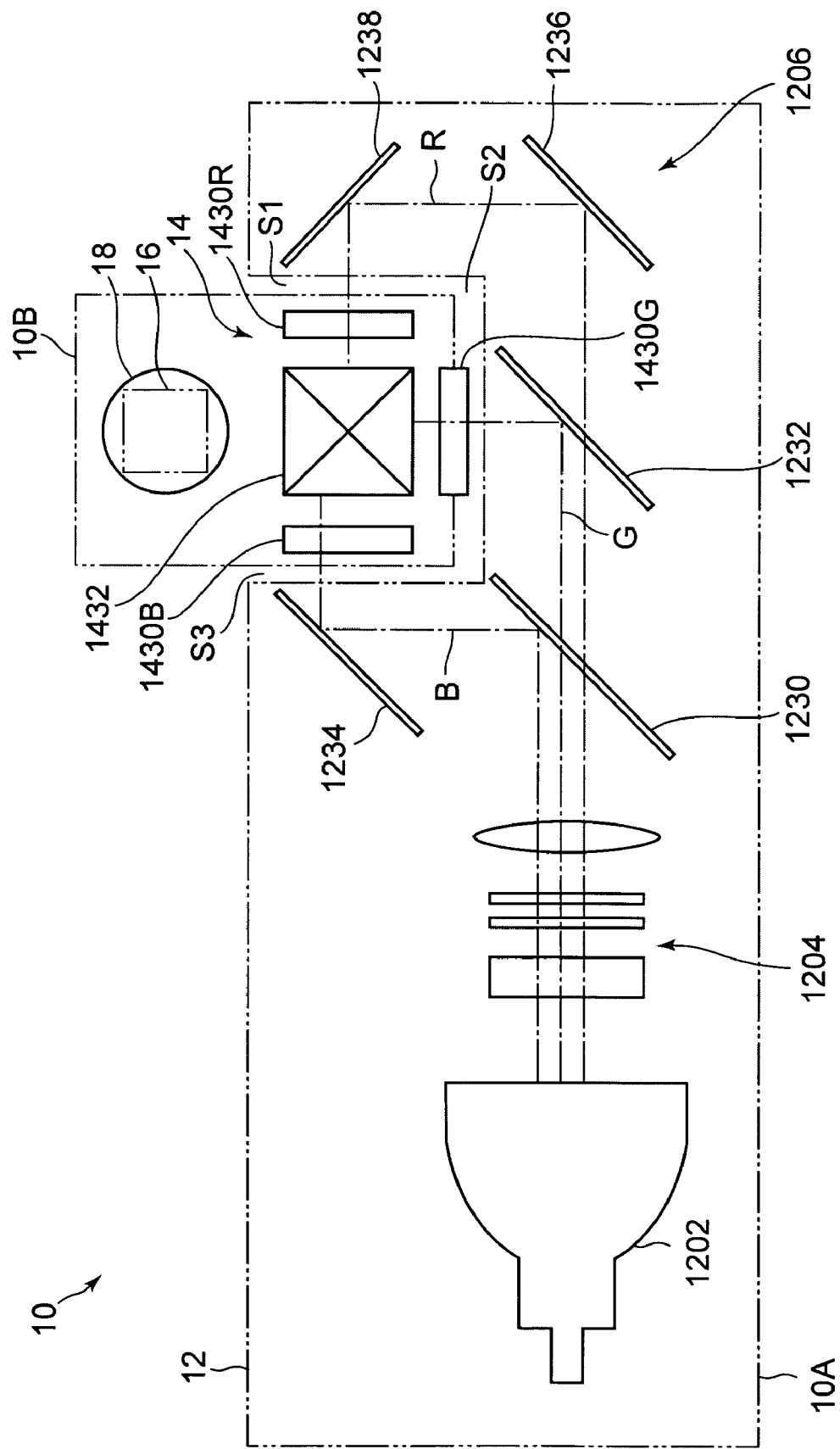
FIG. 21 is a diagram for explaining a configuration of a projector unit 10 in a second embodiment.

FIG. 21 is a diagram for explaining a configuration of a projector unit 10 in the second embodiment. In the following, parts and members similar to those in the first embodiment are given the same reference numerals.

As shown in FIG. 21, illuminating means 12 includes a light source 1202, illuminating optics 1204, and color separating optics 1206.

The color separating optics 1206 are formed of first and second dichroic mirrors 1230, 1232, and first to third mirrors 1234, 1236, 1238.

The first dichroic mirror 1230 is configured to transmit red (R) and green (G) light beams therethrough, and reflect a blue (B) light beam, of light beams guided from the illuminating optics 1204.

The second dichroic mirror 1232 is configured to transmit the red (R) light beam, and reflect the green (G) light beam, of the light beams having passed through the first dichroic mirror 1230.

Therefore, the light beams guided to the first dichroic mirror 1230 from the illuminating optics 1204 are separated into two groups of light beams, namely, the blue (B) light beam, and the red (R) and green (G) light beams, by the first dichroic mirror 1230.

The blue (B) light beam separated by the first dichroic mirror 1230 is reflected by the first mirror 1234.

Of the red (R) and green (G) light beams separated by the first dichroic mirror 1230, the green (G) light beam is reflected by the second dichroic mirror 1232.

Of the red (R) and green (G) light beams separated by the first dichroic mirror 1230, the red (R) light beam passes through the second dichroic mirror 1232, and reaches the third mirror 1238 via the second mirror 1236 to be reflected by the third mirror 1238.

In this way, the R, G, B light beams separated by the color separating optics 1206 are each emitted onto the image forming means 14 from the illuminating means 12.

The image forming means 14 includes three transmissive liquid crystal display units (LC panels) 1430 (1430R, 1430G, 1430B) for respectively displaying image information for the three colors, R, G, B, and a cross dichroic prism 1432 for generating a single image projection light beam by synthesizing the light beams having passed through the corresponding liquid crystal display units 1430 for modulation on the basis of the corresponding three color image information, respectively.

These three liquid crystal display units 1430R, 1430G, 1430B and the cross dichroic prism 1432 are integrally coupled.

Between the three liquid crystal display units 1430R, 1430G, 1430B of the image forming means 14 and portions of the illuminating means 12 faced by these three liquid crystal display units 1430R, 1430G, 1430B are clearances S1, S2, S3, respectively, whereby the image forming means 14 does not interfere with the illuminating means 12 due to play.

The three liquid crystal display units 1430R, 1430G, 1430B each have a display surface 1412 for displaying an image thereon, and further have an image signal (drive signal) and power for displaying the image on the display surface 1412 supplied thereto.

The blue (B) light beam exiting from the illuminating means 12 to the image forming means 14 enters the blue liquid crystal display unit 1430B, where the incident blue light beam passes therethrough to be thereby modulated on the basis of the corresponding image information, after which the modulated blue light beam is guided to the cross dichroic prism 1432.

The green (G) light beam exiting from the illuminating means 12 to the image forming means 14 enters the green liquid crystal display unit 1430G, where the incident green light beam passes therethrough to be thereby modulated on the basis of the corresponding image information, after which the modulated green light beam is guided to the cross dichroic prism 1432.

The red (R) light beam exiting from the illuminating means 12 to the image forming means 14 enters the red liquid crystal display unit 1430R, where the incident red light beam passes therethrough to be thereby modulated on the basis of the corresponding image information, after which the modulated red light beam is guided to the cross dichroic prism 1432.

The three color light beams guided to the cross dichroic prism 1432 are synthesized by the cross dichroic prism 1432 into a single image projection light beam.

An optical path of the image projection light beam extending from the image forming means 14 to a projection lens 18 is formed, similarly to that in the first embodiment, of a first optical path L1 linearly extending from the image forming means 14, a second optical path L2 aligned with the optical axis of the projection lens 18, and a reflecting surface 1602 of a reflecting mirror 16, disposed at a location where these optical paths cross, for bending these optical paths. An angle which the first optical path forms with the second optical path equals 90°.

Therefore, the image projection light beam guided from the cross dichroic prism 1432 is bent 90° upwards by the reflecting surface of the reflecting mirror 16, enters a reflecting mirror 40 (see FIG. 1) via the projection lens 18, and then is projected for image formation onto a rear surface of a screen 50 by the reflecting mirror 40, whereby a color image is formed on a front surface of the screen 50.

Similarly to the first embodiment, in the second embodiment, a part extending from the image forming means 14 to the projection lens 18 is separated from a light source side unit 10A which is a remaining part of the projector unit 10 excluding the part extending from the image forming means 14 to the projection lens 18, and the components in the part extending from the image forming means 14 to the projection lens 18 are integrally coupled to form an image emergence side unit 10B, and further, the light source side unit 10A and the image emergence side unit 10B are attached to a frame 30 via a base member 28.

Furthermore, a support mechanism, an image adjusting mechanism by rotation, and a securing mechanism similar to those in the first embodiment are also provided.

In the second embodiment also, an image displayed on the screen out of position in a rotational direction can be adjusted easily and reliably without requiring a large-scale mechanism and thus with a simple configuration, which is hence advantageous, e.g., in reducing the size, thickness, and cost. Consequently, advantages similar to those provided by the first embodiment can also be provided in the second embodiment.

Note that the case where the image forming means 14 is formed of the three transmissive liquid crystal display units 1430R, 1430G, 1430B and the cross dichroic prism 1432 has been described in the second embodiment. However, the image forming means 14 is not limited to the above-mentioned embodiment, but may, of course, include various known configurations.

What is claimed is:

1. A projection television apparatus comprising:
   a frame;
   a screen of a rear projection type attached to a front surface of the frame; and
   a projector unit, disposed in the frame, for emitting an image projection light beam onto the rear surface of the screen;
   wherein the projector unit comprises;
      illuminating means including a light source,
      image forming means for modulating light beams exiting from the illuminating means on the basis of image information whereby to generate the image projection light beam for exit therefrom, and
      a projection lens for projecting the image projection light beam onto the screen;
   wherein an optical axis of an optical path along which the image projection light beam travels is bent with respect to an optical axis of the projection lens;
   wherein a part extending from the image forming means to the projection lens is separated from a light source side unit which is a remaining part of the projector unit excluding the part extending from the image forming means to the projection lens, and the part extending from the image forming means to the projection lens is formed as an integrally coupled body into an image emergence side unit;

wherein a support mechanism for supporting the image emergence side unit with respect to the frame rotatably around the optical axis of the projection lens along a plane orthogonal to the optical axis is provided;

wherein an image adjusting mechanism by rotation for adjusting an angle of rotation around the optical axis of the projection lens, of the image emergence side unit is provided; and wherein a securing mechanism for loosening and tightening the image emergence side unit with respect to the frame is provided.

2. The projection television apparatus according to claim 1, wherein the support mechanism comprises: a shaft or a bearing hole which is on the optical axis of the projection lens and provided on or in the frame; and a bearing hole or a shaft provided in or on the image emergence side unit so as to be fitted around or into the shaft or the bearing hole provided on or in the frame.

3. The projection television apparatus according to claim 1, wherein the support mechanism comprises: a shaft or a bearing hole which is on the optical axis of the projection lens and provided on or in the frame; a bearing hole or a shaft provided in or on the image emergence side unit so as to be fitted around or into the shaft or the bearing hole provided on or in the frame; support surfaces provided on the frame and extending along the plane orthogonal to the optical axis of the projection lens; and supported surfaces provided on the image emergence side unit and extending along the plane orthogonal to the optical axis of the projection lens.

4. The projection television apparatus according to claim 1, wherein the image adjusting mechanism by rotation includes an eccentric pin, and the eccentric pin comprises: a first shaft portion extending in parallel with the optical axis of the projection lens at a location of the frame distant from the optical axis of the projection lens and being supported rotatably around an axis thereof; a second shaft portion connected to an end portion of the first shaft portion eccentrically and rotatably coupled to a portion of the image emergence side unit; and a manipulation portion for rotational operation provided at an end portion of the second shaft portion.

5. The projection television apparatus according to claim 1, wherein the securing mechanism comprises: screw holes provided at locations of the frame distant from the optical axis of the projection lens; elongated holes corresponding to the screw holes and circumferentially extending around the optical axis of the projection lens on the image emergence side unit; and screw members passing through the elongated holes to be screwed into the screw holes with male screw threads formed at distal ends thereof.

6. The projection television apparatus according to claim 1, wherein the image emergence side unit includes a support block for supporting the part extending from the image forming means to the projection lens, and the support mechanism, the image adjusting mechanism by rotation, and the securing mechanism are provided so as to extend from the frame to the support block.

7. The projection television apparatus according to claim 1, wherein the optical path of the image projection light beam extending from the image forming means to the projection lens comprises: a first optical path linearly extending from the image forming means, a second optical path coaxial with the optical axis of the projection lens, and a reflecting surface, disposed at a location where the first optical path and the second optical path cross, for bending the optical paths.

8. The projection television apparatus according to claim 1, wherein an angle which the first optical path forms with the second optical path includes 90°.

9. The projection television apparatus according to claim 1, wherein the image forming means includes transmissive or reflective liquid crystal display units.

10. The projection television apparatus according to claim 1, wherein a reflecting surface for reflecting the image projection light beam exiting from the projection lens for emission onto a rear surface of the screen is provided between the projector unit and the screen.

* * * * *